United States Patent
Kim et al.

(10) Patent No.: US 12,435,064 B2
(45) Date of Patent: Oct. 7, 2025

(54) QUENCHER AND USES THEREOF

(71) Applicant: SFC CO., LTD., Cheongju-si (KR)

(72) Inventors: Tae Young Kim, Cheongju-si (KR); Goutam Masanta, Cheongju-si (KR); Do Min Lee, Cheongju-si (KR); Ju Man Song, Cheongju-si (KR); Jong Tae Je, Cheongju-si (KR)

(73) Assignee: SFC CO., LTD., Cheongju-si (KR)

( * ) Notice: Subject to any disclaimer, the term of this patent is extended or adjusted under 35 U.S.C. 154(b) by 722 days.

(21) Appl. No.: 17/747,863

(22) Filed: May 18, 2022

(65) Prior Publication Data

US 2022/0274960 A1      Sep. 1, 2022

Related U.S. Application Data

(63) Continuation of application No. PCT/KR2020/015592, filed on Nov. 9, 2020.

(30) Foreign Application Priority Data

Nov. 19, 2019   (KR) .................. 10-2019-0148348
Nov. 2, 2020    (KR) .................. 10-2020-0144159

(51) Int. Cl.
     *C07D 403/06*    (2006.01)
     *C07D 403/14*    (2006.01)

(52) U.S. Cl.
     CPC ......... *C07D 403/06* (2013.01); *C07D 403/14* (2013.01)

(58) Field of Classification Search
     CPC .................................................. C07D 403/06
     See application file for complete search history.

(56) References Cited

U.S. PATENT DOCUMENTS 10,982,262 B2 *  4/2021  Lee ...................... C07D 513/06
11,613,774 B2 *  3/2023  Masanta ............... C07D 519/00
                                                     435/6.12

FOREIGN PATENT DOCUMENTS

KR  10-2017-0101360 A  9/2017
KR  10-2019-0062162 A  6/2019
WO     2019/098756 A2  5/2019

OTHER PUBLICATIONS

Jansen-Van Vuuren, R. D. et al. Tuning the optoelectronic properties of cyanine and ketocyanine dyes by Incorporation of 9,9-di-n-propylfluorenylindolen. Dyes and Pigments. 2014 [electronic publication: Sep. 22, 2013], vol. 101, pp. 1-8.
Redy, O. et al. A simple FRET-based modular design for diagnostic probes. Organic & Biomolecular Chemistry. 2012 electronic publication Nov. 17, 2011], vol. 10, No. 4, pp. 710-715.
Kisin-Finfer, E. et al. Synthesis and evaluation of new NIR-fluorescent probes for cathepsin B: ICT versus FRET as a turn-ON mode-of-action. Bioorganic & Medicinal Chemistry Letters. 2014 [electronic publication Apr. 16, 2014], vol. 24, pp. 2453-2458.
Greene T. W. et al., Protective Groups in Organic Synthesis, John Wiley & Sons, New York. 1999, 3rd edition, pp. 1-800.
Cardullo R. A. et al. "Detection of nucleic acid hybridization by nonradiative fluorescence resonance energy transfer" Proc. Natl. Acad. Sci. USA. vol. 85: pp. 8790-8794; Dec. 1988.
Dexter, D. L. "A Theory of Sensitized Luminescence in Solids" The Journal of Chemical Physics 21: pp. 836-850; May 1953.
Hochstrasser, R. A. et al. "Distance distribution in a dye-linked oligonucleotide determined by time-resolved fluorescence energy transfer" Biophysical Chemistry 45: pp. 133-141; Jul. 1992.
Selvin, P. R. "Fluorescence Resonance Energy Transfer" Methods in Enzymology 246: pp. 300-334; 1995.
Steinberg, I. Z. "Long-range nonradiative transfer of electronic excitation energy in proteins and polypeptides" Annual Reviews Biochem., 40: pp. 83-114; 1971.
Stryer, L. "Fluorescence energy transfer as a spectroscopic ruler" Annual Reviews Biochem., 47: pp. 819-846; 1978.
Wang, G. T. et al. "Design and synthesis of new fluorogenic HIV prrotease substrates based on resonance energy transfer" Tetrahedron Letters 31: pp. 6493-6496; 1990.
Wang, Y. et al. "Rapid sizing of short tandem repeat alleles using capillary array electrophoresis and energy-transfer fluorescent primers" Anal. Chem. 67: pp. 1197-1203; 1995.
International Search Report issued in PCT/KR2020/015592; mailed Feb. 24, 2021.
The extended European search report issued by the European Patent Office on Dec. 19, 2023, which corresponds to European Patent Application No. 20889888.2-1110 and is related to U.S. Appl. No. 17/747,863.

* cited by examiner

*Primary Examiner* — Golam M Shameem
(74) *Attorney, Agent, or Firm* — Studebaker Brackett PLLC

(57) ABSTRACT

The present invention relates to a quencher exhibiting a quenching effect on a fluorescent material exhibiting a luminescent property at an excited energy level, and various uses thereof.

14 Claims, 2 Drawing Sheets

Specification includes a Sequence Listing.

QUENCHER AND USES THEREOF

CROSS-REFERENCE TO RELATED APPLICATION

This application is based on the PCT Application No. PCT/KR2020/015592, filed on Nov. 9, 2020, and claims the benefit of priority from the prior Korean Patent Application No. 10-2019-0148348, filed on Nov. 19, 2019, and Korean Patent Application No. 10-2020-0144159, filed on Nov. 2, 2020, the disclosure of which is incorporated herein by reference in its entirety.

REFERENCE TO AN ELECTRONIC SEQUENCE LISTING

The contents of the Sequence Listing (sequence listing.txt; Date of Creation: Sep. 3, 2025; and Size: 374 bytes) is herein incorporated by reference in its entirety.

BACKGROUND

1. Field of the Invention

The present invention relates to a quencher having a quenching effect on a fluorescent material exhibiting a luminescent property at an excited energy level, and various uses thereof.

2. Discussion of Related Art

A quencher means a molecule capable of quenching the fluorescence of a fluorescent molecule, and a dye having a property of absorbing light is generally used.

A quenching phenomenon is known to occur through a mechanism including fluorescence resonance energy transfer (FRET), photo-induced electron transfer and dye coagulation such as H-dimer formation.

When a quencher is used to control or quench the fluorescence of a fluorescent dye, it is most important whether the absorption wavelength range of a quenching dye covers (overlaps) a considerable part or the entire region of the wavelength region of fluorescence exhibited by the fluorescent dye.

In order to obtain a quenching effect, the length between the fluorescence dye and the quencher is also important, and for example, the number of bases in the case of DNA or the number of amino acids in the case of a peptide/protein is considered. To obtain a higher quenching effect, the length of a linker labeled with a fluorescence dye and a quencher may be adjusted.

In the case of a quencher generally used commercially in the field of biology, although a fluorescence-fluorescent dye combination, which uses a FRET phenomenon, has been widely used, a dye structure does not emit light but only absorbs light is generally selected. The combined fluorescent-quenching, and fluorescent-fluorescent dyes may impart a kind of on/off function of fluorescence because the original fluorescence is restored or intensified when the distance between the two dyes increases or the two dyes are separated from a biomolecule, and in consideration of such a characteristic, may be widely used in designing biosensors or activation probes that can respond to biomarkers for specific proteins/enzymes.

When fluorescent or quenching dyes used in the field of biology are used alone, they are only limited to FDA-approved dyes such as indocyanine green or methylene blue, and a reactive group capable of binding to a substituent of a biomolecule is introduced. While various types of reactive groups described above are known, substituent selectivity, reaction rate, yield, reproducibility and stability have been verified by researchers for a long time. In recent years, reactive groups introduced to a dye for practical research or commercial purposes are limited to several.

For example, the most frequently used reactive groups for binding with an amine group of a protein molecule are succinimidyl ester and isothiocyanate, the most frequently used reactive group for binding with a thiol group of a protein molecule is maleimide, and as a reactive group for binding with a hydroxyl group of a protein molecule, dichlorotriazine is mainly used.

However, in most cases, the reactive groups are bonded by substitution or it is difficult to maintain long-term reaction and storage stability under a water-soluble condition.

SUMMARY OF THE INVENTION

The present invention is directed to providing a novel quencher, which is a compound capable of widely being used to observe the characteristics of a biomolecule in the optical imaging field.

The present invention is also directed to providing an oligonucleotide, a composition and a support for detecting a nucleic acid, including the novel quencher, and a method of detecting a nucleic acid using the same.

According to one aspect of the present invention for solving the above-described technical problems, a quencher represented by Formula 1 below is provided:

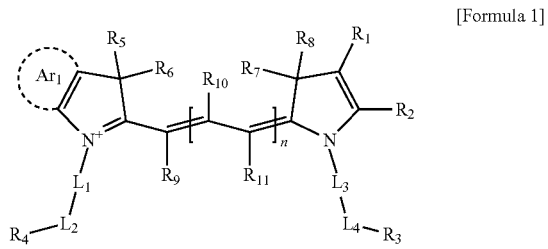

[Formula 1]

wherein $R_1$ and $R_2$ are each conjugated with a and b, b and c, or c and d of Formula 2 below,

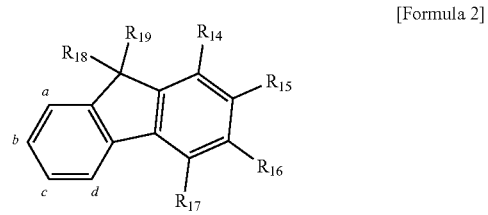

[Formula 2]

$Ar_1$ is selected from substituted or unsubstituted aryl, substituted or unsubstituted heteroaryl, and Formula 2, n is an integer of 1 to 3, and $R_3$ to $R_{19}$ are each independently selected from a functional group selected from hydrogen, deuterium, substituted or unsubstituted $C_1$-$C_{10}$ alkyl, substituted or unsubstituted $C_1$-$C_{10}$ heteroalkyl containing at least one hetero atom, substituted or unsubstituted $C_2$-$C_{10}$ alkenyl, substituted or unsubstituted $C_2$-$C_{10}$ alkynyl, substituted or unsubstituted $C_3$-$C_{20}$ cycloalkyl, substituted or unsubstituted $C_1$-$C_{10}$ alkoxy, substituted or unsubstituted aryloxy, substituted or unsubstituted $C_1$-$C_{10}$ haloalkyl, halogen, cyano, hydroxy, substituted or unsubstituted amino, substituted or unsubstituted amide, carbamate, sulfhydryl, nitro, carboxyl, carboxylate, substituted or unsubstituted aryl, substituted or unsubstituted heteroaryl, substituted or unsubstituted aralkyl, quaternary ammonium, phosphoric acid, phosphate, substituted ketone, aldehyde, substituted ester, substituted sulfonyl, substituted or unsubstituted sulfonamide, acyl chloride, sulfonic acid, sulfonate, hydrazine, thiol, acetal, ketal, phosphonate (phosphite), hypophosphite, sulfohydroxy, sulfate, azido, guanidium, ketene, thiocarbonyl, aminothiocarbonyl, polyalkyleneoxide, a carboxyl derivative, dienophile, sulfonyl halide, epoxide, and phosphoramidite; and a reactive group capable of covalent bonding with a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, $R_5$ and $R_6$ are each independently present or connected to form a ring, $R_7$ and $R_8$ are each independently present or connected to form a ring, $R_{18}$ and $R_{19}$ are each independently present or connected to form a ring, $L_1$ and $L_3$ are linkers including a single bond or 1 to 40 non-hydrogen atoms, and $L_2$ and $L_4$ are linkers including 1 to 40 non-hydrogen atoms.

In addition, according to another aspect of the present invention, an oligonucleotide that includes the above-described quencher, a minor groove binder (MGB), and a fluorophore is provided.

In addition, according to still another aspect of the present invention, a composition for detecting a nucleic acid, including the above-described oligonucleotide, is provided.

In addition, according to yet another aspect of the present invention, a support for detecting a nucleic acid, including the above-described quencher, a support, and a linker connecting the quencher and the support, is provided.

In addition, according to yet another aspect of the present invention, a method of detecting a nucleic acid, which includes (a) preparing a reaction mixture that includes a target nucleic acid, a reagent for amplifying the target nucleic acid, and the oligonucleotide including a quencher, a minor groove binder (MGB) and a fluorophore, (b) amplifying the target nucleic acid of the reaction mixture by a polymerase chain reaction, and (c) measuring the fluorescence intensity of the reaction mixture, is provided.

The present invention relates to a quencher exhibiting a quenching effect on a fluorescent material exhibiting a luminescence property at an excited energy level, and various uses thereof, and the quencher according to the present invention can exhibit an excellent quenching property due to high quenching efficiency compared to a conventional quencher.

DETAILED DESCRIPTION OF EXEMPLARY EMBODIMENTS

Figure 1:
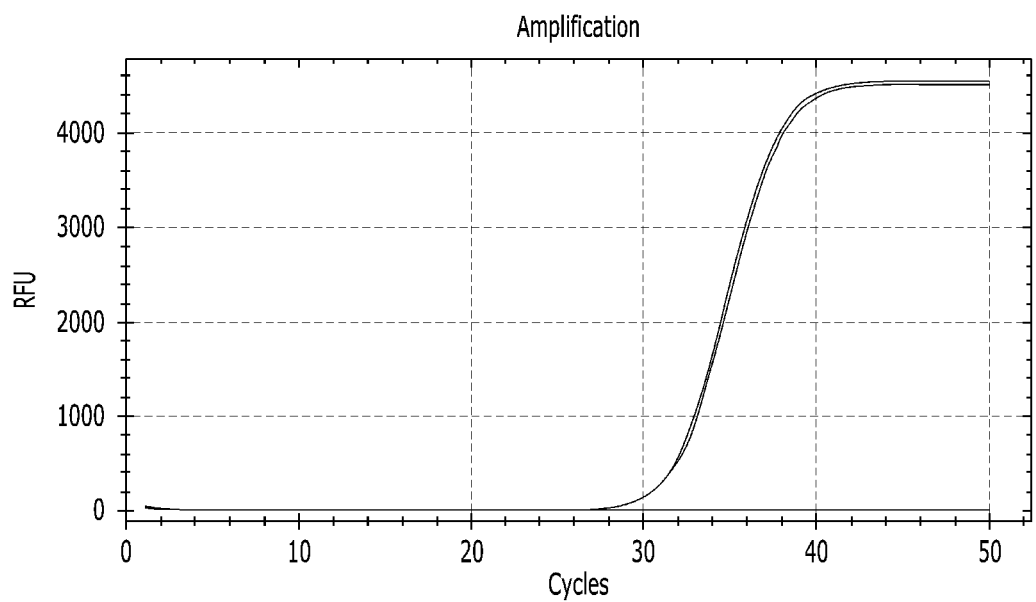
FIGS. 1 to 4 show a result of real-time PCR amplification using double-labeled probes including a quencher according to various embodiments of the present invention.

In order to better understand the present invention, certain terms are defined herein for convenience. Unless defined otherwise herein, scientific and technical terms used herein will have meanings commonly understood by those of ordinary skill in the art.

In addition, unless specifically indicated otherwise, terms in a singular form also include plural forms, and terms in a plural form should be understood to include singular forms as well.

This research was supported by a grant from the Ministry of Trade, Industry and Energy of the Republic of Korea, [Advanced Technology Center (ATC) Project (Project No. 10076988, *Development of phosphor for molecular diagnostics and its applied technology*)].

Novel Quencher

According to one aspect of the present invention, a quencher represented by Formula 1 below is provided:

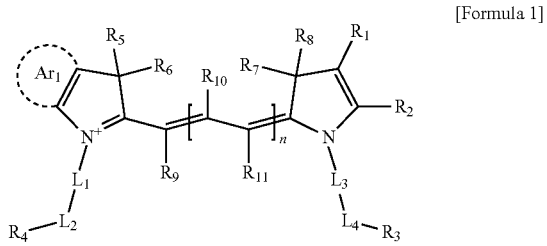

[Formula 1]

wherein $R_1$ and $R_2$ are each conjugated with a and b, b and c, or c and d of Formula 2 below,

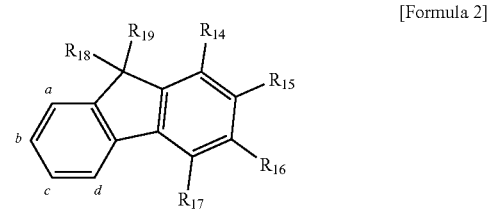

[Formula 2]

$Ar_1$ is selected from substituted or unsubstituted aryl, substituted or unsubstituted heteroaryl, and Formula 2, n is an integer of 1 to 3, and $R_3$ to $R_{19}$ are each independently selected from a functional group selected from hydrogen, deuterium, substituted or unsubstituted $C_1$-$C_{10}$ alkyl, substituted or unsubstituted $C_1$-$C_{10}$ heteroalkyl containing at least one hetero atom, substituted or unsubstituted $C_2$-$C_{10}$ alkenyl, substituted or unsubstituted $C_2$-$C_{10}$ alkynyl, substituted or unsubstituted $C_3$-$C_{20}$ cycloalkyl, substituted or unsubstituted $C_1$-$C_{10}$ alkoxy, substituted or unsubstituted aryloxy, substituted or unsubstituted $C_1$-$C_{10}$ haloalkyl, a halogen, cyano, hydroxy, substituted or unsubstituted amino, a substituted or unsubstituted amide, carbamate, sulfhydryl, nitro, carboxyl, carboxylate, substituted or unsubstituted aryl, substituted or unsubstituted heteroaryl, substituted or unsubstituted aralkyl, quaternary ammonium, phosphoric acid, phosphate, substituted ketone, aldehyde, substituted ester, substituted sulfonyl, substituted or unsubstituted sulfonamide, acyl chloride, sulfonic acid, sulfonate, hydrazine, thiol, acetal, ketal, phosphonate (phosphite), hypophosphite, sulfohydroxy, sulfate, azido, guanidium, ketene, thiocarbonyl, aminothiocarbonyl, polyalkyleneoxide, a carboxyl derivative, dienophile, sulfonyl halide, epoxide and phosphoramidite; and a reactive group capable of covalent bonding with a functional group selected from carboxyl, a carboxyl derivative, hydroxyl, haloalkyl, a dienophile, an aldehyde, ketone, sulfonyl halide, thiol, amine, sulfhydryl, alkene, epoxide, and phosphoramidite.

In one embodiment, in the quencher represented by Formula 1, at least one of the substituents of $R_3$ to $R_{19}$ and $Ar_1$ may be a substituted or unsubstituted amino group. In addition, in another embodiment, at least one of the substituents of $Ar_1$ may be a substituted or unsubstituted amino group.

When at least one of the substituents of the $R_3$ to $R_{19}$ and $Ar_1$ is a substituted amino group, the amino group may be a mono- or di-substituted amino group.

The substituent included in the mono- or di-substituted amino group binds to nitrogen of the amino group, and as the substituent, the same functional groups and/or reactive groups as defined above for $R_3$ to $R_{19}$ may be used. Preferably, the substituent binding to the nitrogen of the amino group may be hydrogen, deuterium, substituted or unsubstituted $C_1$-$C_{10}$ alkyl, substituted or unsubstituted $C_2$-$C_{10}$ alkenyl, substituted or unsubstituted $C_3$-$C_{20}$ cycloalkyl, substituted or unsubstituted aryl, substituted or unsubstituted heteroaryl, or substituted or unsubstituted aralkyl.

In addition, the substituent binding to the nitrogen of the amino group may be connected with another substituent binding to the nitrogen to form a ring, or connected with another substituent other than the amino group to form a ring.

Referring to Compound 14, which is one of specific examples of the quencher represented by Formula 1, when the substituent binding to nitrogen of the amino group is connected with another substituent binding to the nitrogen to form a ring, the amino group connected with both substituents to form a ring may also be defined as a heterocycloalkyl group.

In one embodiment, $R_5$ and $R_6$ among $R_3$ to $R_{19}$ may each be independently present as the above-described functional groups, but in some embodiments, may be connected with each other to form a ring (e.g., a ring consisting of 4, 5, 6 or more atoms, or a fused ring in which a plurality of rings are fused).

In one embodiment, $R_7$ and $R^8$ among $R_3$ to $R_{19}$ may each be independently present as the above-described functional groups, but in some embodiments, may be connected with each other to form a ring (e.g., a ring consisting of 4, 5, 6 or more atoms, or a fused ring in which a plurality of rings are fused).

In one embodiment, $R_{18}$ and $R_{19}$ among $R_3$ to $R_{19}$ may each be independently present as the above-described functional groups, but in some embodiments, may be connected with each other to form a ring (e.g., a ring consisting of 4, 5, 6 or more atoms, or a fused ring in which a plurality of rings are fused).

In another embodiment, $R_5$ and $R_6$, $R_7$ and $R_8$, and $R_{18}$ and $R_{19}$ among $R_3$ to $R_{19}$ may be connected with each other to form a ring (e.g., a ring consisting of 4, 5, 6 or more atoms, or a fused ring in which a plurality of rings are fused).

Here, when at least one combination selected from $R_5$ and $R_6$, $R_7$ and $R_8$, and $R_{18}$ and $R_{19}$ are connected with each other to form a ring, any carbon in the ring may be substituted with a functional group selected from deuterium, substituted or unsubstituted $C_1$-$C_{40}$ alkyl, substituted or unsubstituted $C_1$-$C_{40}$ heteroalkyl having at least one hetero atom, substituted or unsubstituted $C_2$-$C_{40}$ alkenyl, substituted or unsubstituted $C_2$-$C_{40}$ alkynyl, substituted or unsubstituted $C_1$-$C_{40}$ alkoxy, substituted or unsubstituted aryloxy, substituted or unsubstituted $C_1$-$C_{40}$ haloalkyl, halogen, cyano, hydroxy, substituted or unsubstituted amino, substituted or unsubstituted amide, carbamate, sulfhydryl, nitro, carboxyl, carboxylate, substituted or unsubstituted aryl, substituted or unsubstituted heteroaryl, substituted or unsubstituted aralkyl, quaternary ammonium, phosphoric acid, phosphate, ketone, aldehyde, ester, acylchloride, sulfonic acid and sulfonate, substituted or unsubstituted $C_1$-$C_{40}$ alkylthio, substituted or unsubstituted arylthio, substituted or unsubstituted $C_3$-$C_{20}$ cycloalkyl, substituted or unsubstituted $C_1$-$C_{20}$ heterocycloalkyl having at least one hetero atom, substituted or unsubstituted $C_3$-$C_{20}$ cycloalkenyl, substituted or unsubstituted $C_2$-$C_{20}$ heterocycloalkenyl having at least one hetero atom, substituted or unsubstituted silyl, substituted or unsubstituted germanium, ether, nitryl, polyalkyleneoxide, carboxyl, a carboxyl derivative, hydroxyl, haloalkyl, dienophile, sulfonyl halide, epoxide and phosphoramidite, or at least one selected from reactive groups capable of covalent bonding with the functional group.

In addition, in Formula 2 connected to $R_1$ and $R_2$ of Formula 1, $R_{14}$ to $R_{17}$ may each be independently present as the above-described functional groups, but in some embodiments,
adjacent substituents of $R_{14}$ to $R_{17}$ may be connected to each other to form a ring (e.g., a ring consisting of 4, 5, 6 or more atoms, or a fused ring in which a plurality of rings are fused).

Here, when adjacent substituents of $R_{14}$ to $R_{17}$ are connected to each other to form a ring, any carbon in the ring may be substituted with the same functional group and/or reactive group as defined for the above-described $R_3$ to $R_{19}$.

$L_1$ and $L_3$ are linkers including a single bond or 1 to 40 non-hydrogen atoms, and $L_2$ and $L_4$ are linkers including 1 to 40 non-hydrogen atoms. Here, the linker including a non-hydrogen atom means a group consisting of binding of an atom such as carbon, nitrogen or oxygen, not hydrogen. Accordingly, the linker may include a chain and/or ring (e.g., an aromatic ring and/or an aliphatic ring) consisting of binding of a non-hydrogen atom such as carbon, nitrogen or oxygen.

More specifically, the linker may be substituted or unsubstituted $C_1$-$C_{50}$ alkyl or substituted or unsubstituted $C_2$-$C_{50}$ heteroalkyl having at least one hetero atom, but the present invention is not necessarily limited thereto.

In addition, even when the linker including a non-hydrogen atom is not explicitly mentioned above, it may include modified examples that can be confirmed from Compound 1 to Compound 22 representing specific examples of the quencher represented by Formula 1.

In one embodiment, at least one of $R_3$ to $R_{19}$ may be a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group.

Particularly, at least one of $R_3$ and $R_4$ may be a functional group selected from carboxyl, a carboxyl derivative, hydroxyl, haloalkyl, dienophile, aldehyde, ketone, sulfonyl halide, thiol, amine, sulfhydryl, alkene, and phosphoramidite, or a reactive group capable of covalent bonding with the functional group.

In another embodiment, at least one of at least one of the substituents of $R_3$ to $R_{19}$ and $Ar_1$ is a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group.

Here, as the reactive group, (a) a carboxyl group and a derivative thereof: N-hydroxysuccinimide ester, N-hydroxybenzotriazole ester, acyl halide, acyl imidazole, thioester, p-nitrophenyl ester, alkyl ester, alkenyl ester, alkynyl ester, and aromatic ester; (b) hydroxyl that can be converted to ester, ether, or aldehyde; (c) haloalkyl which is able to be covalently attached to another functional group by the substitution of halogen with a nucleophilic functional group such as amine, a carboxylate anion, a thiol anion, a carboanion or an alkoxide anion; (d) dienophile which is able to have a: Diels-Elder reaction with a maleimido group; (e) aldehyde or ketone capable of forming a carbonyl derivative such as imide, hydrazone, semicarbazone, or oxime; (f) sulfonyl halide which forms sulfonamide by the reaction with amine; (g) thiol which is able to be converted into disulfide or react with acyl halide; (h) amine or sulfhydryl which is able to be acylated, alkylated or oxidized; (i) alkene which is involved in cycloaddition, acylation, or Michael reaction; (j) epoxide which is able to react with an amine or hydroxyl compound; (k) phosphoramidite, and other standard functional groups useful for a nucleic acid reaction may be used. These reactive groups may be suitably selected so as not to participate or interfere with the reaction necessary to synthesize a reactive quencher.

In another embodiment, these reactive groups may be protected with a protective group so as not to participate in a random reaction in the presence of the protective group. For example, when the reactive group is hydroxyl, as a protective group, trialkylsilyl, 4,4-dimethoxytrityl or a derivative thereof may be used. For preferable examples of protective groups, reference may be made to contents of the following reference (Greene et al., PROTECTIVE GROUPS IN ORGANIC SYNTHESIS, John Wiley & Sons, New York, 1999).

Quenchers according to various embodiments of the present invention are capable of binding to and labeling a target biomolecule (e.g., nucleic acid) through the above-described reactive group.

The above-described reactive groups are functional groups that are able to react with a functional group such as an amino group, an imino group, a thiol group or a hydroxyl group of a target biomolecule, and may form a covalent bond, such as an amide bond, an imide bond, a urethane bond, an ester bond, a phosphite bond, a phosphate bond, or a guanine bond, between a quencher and a target biomolecule.

In addition, $R_1$ and $R_2$ of Formula 1 may each be conjugated with a and b, b and c, or c and d of Formula 2. For example, $R_1$ may be conjugated with a of Formula 2, $R_2$ may be conjugated with b of Formula 2, and vice versa.

In addition, when any functional group among $R_3$ to $R_{19}$ and $Ar_1$ is substituted, any carbon in the functional group may be substituted with a functional group selected from deuterium, substituted or unsubstituted $C_1$-$C_{40}$ alkyl, substituted or unsubstituted $C_1$-$C_{40}$ heteroalkyl having at least one hetero atom, substituted or unsubstituted $C_2$-$C_{40}$ alkenyl, substituted or unsubstituted $C_2$-$C_{40}$ alkynyl, substituted or unsubstituted $C_1$-$C_{40}$ alkoxy, substituted or unsubstituted aryloxy, substituted or unsubstituted $C_1$-$C_{40}$ haloalkyl, halogen, cyano, hydroxy, substituted or unsubstituted amino, substituted or unsubstituted amide, carbamate, sulfhydryl, nitro, carboxyl, carboxylate, substituted or unsubstituted aryl, substituted or unsubstituted heteroaryl, substituted or unsubstituted aralkyl, quaternary ammonium, phosphoric acid, phosphate, ketone, aldehyde, ester, acylchloride, sulfonic acid and sulfonate, substituted or unsubstituted $C_1$-$C_{40}$ alkylthio, substituted or unsubstituted arylthio, substituted or unsubstituted $C_3$-$C_{20}$ cycloalkyl, substituted or unsubstituted $C_1$-$C_{20}$ heterocycloalkyl having at least one hetero atom, substituted or unsubstituted $C_3$-$C_{20}$ cycloalkenyl, substituted or unsubstituted $C_2$-$C_{20}$ heterocycloalkenyl having at least one hetero atom, substituted or unsubstituted silyl, substituted or unsubstituted germanium, ether, nitrile, polyalkyleneoxide, carboxyl, a carboxyl derivative, hydroxyl, haloalkyl, dienophile, aldehyde, ketone, sulfonyl halide, thiol, amine, sulfhydryl, alkene, epoxide, and phosphoramidite, or at least one selected from reactive groups capable of covalent bonding with the functional group.

In the present invent ion, when Ra is alkenyl or alkynyl, sp2-hybrid carbon of the alkenyl or sp-hybrid carbon of the alkynyl may be directly bonded, or indirectly bonded by sp3-hybrid carbon of alkyl binding to sp2-hybrid carbon of the alkenyl or sp-hybrid carbon of the alkynyl.

In the present invention, a $C_a$-$C_b$ functional group means a functional group that has a to b carbon atoms. For example, $C_a$-$C_b$ alkyl means a saturated aliphatic group, including linear and branched alkyls having a to b carbon atoms. The linear or branched alkyls may be an alkyl containing up to 40 carbons in the main chain thereof (e.g., $C_1$-$C_{10}$ linear or $C_3$-$C_{10}$ branched).

Specifically, the alkyl may be methyl, ethyl, n-propyl, i-propyl, n-butyl, s-butyl, i-butyl, t-butyl, pent-1-yl, pent-2-yl, pent-3-yl, 3-methylbut-1-yl, 3-methylbut-2-yl, 2-methylbut-2-yl, 2,2,2-trimethyleth-1-yl, n-hexyl, n-heptyl, and n-octyl.

In addition, in the present invention, alkoxy means both of a —O-(alkyl) group and a —O-(unsubstituted cycloalkyl) group, and is linear or branched hydrocarbon having one or more ether groups and 1 to 10 carbon atoms.

Specifically, the alkoxy includes methoxy, ethoxy, propoxy, isopropoxy, n-butoxy, tert-butoxy, sec-butoxy, n-pentoxy, n-hexoxy, 1,2-dimethylbutoxy, cyclopropyloxy, cyclobutyloxy, cyclopentyloxy, and cyclohexyloxy, but the present invention is not limited thereto.

In addition, in the present invention, halogen means fluoro (—F), chloro (—Cl), bromo (—Br), or iodo (—I), and haloalkyl means alkyl substituted with the above described halogen. For example, halomethyl means methyl in which at least one of the hydrogens is replaced with halogen (—$CH_2X$, —$CHX_2$ or —$CX_3$).

In the present invention, aralkyl is the generic term for —$(CH_2)_n$Ar, which is a functional group in which aryl substituted for a carbon of alkyl. As an example of the aralkyl includes benzyl (—$CH_2C_6H_5$) or phenethyl (—$CH_2CH_2C_6H_5$).

In the present invention, aryl means, unless defined otherwise, an unsaturated aromatic ring including a single ring, or multiple rings (preferably, 1 to 4 rings) conjugated or connected by a covalent bond. Non-limiting examples of the aryl include phenyl, biphenyl, o-terphenyl, m-terphenyl, p-terphenyl, 1-naphthyl, 2-naphthyl, 1-anthryl, 2-anthryl, 9-anthryl, 1-phenanthrenyl, 2-phenanthrenyl, 3-10 phenanthrenyl, 4-phenanthrenyl, 9-phenanthrenyl, 1-pyrenyl, 2-pyrenyl, and 4-pyrenyl.

In the present invention, heteroaryl means a functional group in which one or more carbon atoms in the aryl defined above are substituted with a non-carbon atom such as nitrogen, oxygen or sulfur. Non-limiting examples of the hetero aryl include furyl, tetrahydrofuryl, pyrrolyl, pyrrolidinyl, thienyl, tetrahydrothienyl, oxazolyl, isoxazolyl, triazolyl, thiazolyl, isothiazolyl, pyrazolyl, pyrazolidinyl, oxadiazolyl, thiadiazolyl, imidazolyl, imidazolinyl, pyridyl, pyridaziyl, triazinyl, piperidinyl, morpholinyl, thiomorpholinyl, pyrazinyl, piperainyl, pyrimidinyl, naphthyridinyl, benzofuranyl, benzothienyl, indolyl, indolinyl, indolizinyl, indazolyl, quinolizinyl, quinolinyl, isoquinolinyl, cinnolinyl, phthalazinyl, quinazolinyl, quinoxalinyl, pteridinyl, quinuclidinyl, carbazoyl, acridinyl, phenazinyl, phenothizinyl, phenoxazinyl, purinyl, benzimidazolyl, benzothiazolyl, and analogs conjugated therewith.

In the present invention, unless defined otherwise, a hydrocarbon ring (cycloalkyl) or a hydrocarbon ring having a hetero atom (heterocycloalkyl) may be understood as a cyclic structure of an alkyl or heteroalkyl, respectively.

Non-limiting examples of the cycloalkyls include cyclopentyl, cyclohexyl, 1-cyclohexenyl, 3-cyclohexenyl, and cycloheptyl. Non-limiting examples of the heterocycloalkyls include 1-(1,2,5,6-tetrahyropyrinyl), 1-piperidinyl, 2-piperidinyl, 3-piperidinyl, 4-morpholinyl, 3-morpholinyl, tetrahydrofuran-2-yl, tetrahyrofuran-3-yl, tetrahydrothiene-2-yl, tetrahydrothiene-3-yl, 1-piperazinyl, and 2-piperazinyl.

In addition, the cycloalkyl or heterocycloalkyl may have a form with which cycloalkyl, heterocycloalkyl, aryl or hetero aryl is conjugated or connected by a covalent bond.

Here, the polyalkyleneoxide is a water-soluble polymer functional group, and includes polyethylene glycol (PEG), polypropylene glycol (PPG), a polyethylene glycol-polypropylene glycol (PEG-PPG) copolymer, and an N-substituted methacrylamide-containing polymer and copolymer.

The polyalkyleneoxide may be additionally substituted, as needed, as long as the characteristics of a polymer are maintained. For example, the substitution may be a chemical bond for increasing or decreasing the chemical or biological stability of a polymer. As a specific example, any carbon or terminal carbon in the polyalkyleneoxide may be substituted with hydroxy, alkyl ether (methyl ether, ethyl ether, propyl ether or the like), carboxylemethyl ether, carboxyethyl ether, benzyl ether, dibenzylmethyl ether, or dimethylamine. In one embodiment, the polyalkyleneoxide may be polyethyleneoxide terminated with methyl ether (mPEG), wherein mPEG is represented by the Formula-$(CH_2CH_2O)_nCH_3$, whose size may change depending on the size of n corresponding to the number of ethylene glycol repeat units.

In addition, the quencher represented by Formula 1 may have a structure further including a counter ion. The counter ion, which is an organic or inorganic anion, may be suitably selected in consideration of the solubility and stability of the quencher.

Examples of the counter ions of the quencher according to one embodiment of the present invention include inorganic anions such as a phosphoric acid hexafluoride ion, a halogen ion, a phosphoric acid ion, a perchloric acid ion, a periodic acid ion, an antimony hexafluoride ion, a tartaric acid hexafluoride ion, a fluoroboric acid ion, and a tetrafluoride ion; and organic anions such as a thiocyanate ion, a benzenesulfonic acid ion, a naphthalenesulfonic acid ion, a p-toluenesulfonic acid ion, an alkylsulfonic acid ion, a benzenecarboxylic acid ion, an alkylcarboxylic acid ion, a trihaloalkylcarboxylic acid ion, an alkyl sulfonic acid ion, a trihaloalkylsulfonic acid ion, and a nicotinic acid ion. In addition, metal compound ions such as bisphenyldiol, thiobisphenol chelate, and bisdiol-α-diketone, metal ions such as sodium and potassium, and quaternary ammonium salts may also be selected as the counter ions.

More specifically, the quencher according to one embodiment of the present invention may be represented by Formula 3 below.

[Formula 3]

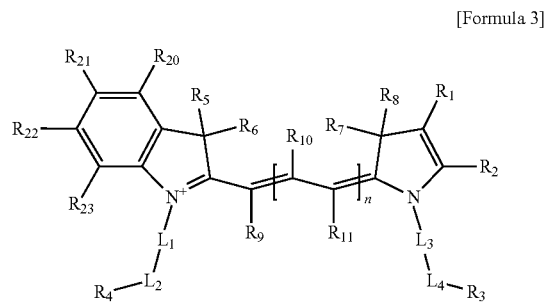

The definition of $R_{21}$ to $R_{23}$ is the same as that of $R_3$ to $R_{19}$, at least one of $R_3$ to $R_{23}$ is a functional group selected from carboxyl, carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group, and at least one of $R_3$ to $R_{23}$ may be a substituted or unsubstituted amino group. In addition, in another embodiment, at least one of $R_3$ to $R_{23}$ may be a substituted amino group. Preferably, at least $R_{21}$ is a substituted amino group.

When at least one of $R_3$ to $R_{23}$ is a substituted amino group, the amino group may be a mono- or di-substituted amino group.

A substituent included in the mono- or di-substituted amino group binds to the nitrogen of the amino group, and as the substituent, the same functional group and/or reactive group defined above for $R_3$ to $R_{19}$ may be used. Preferably, the substituent binding to nitrogen of the amino group may be hydrogen, deuterium, substituted or unsubstituted $C_1$-$C_{10}$ alkyl, substituted or unsubstituted $C_2$-$C_{10}$ alkenyl, substituted or unsubstituted $C_3$-$C_{20}$ cycloalkyl, substituted or unsubstituted aryl, substituted or unsubstituted heteroaryl, or substituted or unsubstituted aralkyl.

In addition, the substituent binding to nitrogen of the amino group may form a ring by connection with another substituent binding to the nitrogen, or by connection with another substituent other than the amino group.

When the substituent binding to nitrogen of the amino group forms a ring by connection with another substituent binding to the nitrogen, the amino group forming a ring by connection of two substituents may also be defined as a heterocycloalkyl group.

A specific example of the quencher represented by Formula 1 is as follows: Quenchers exemplified below are some examples of the quencher represented by Formula 1, and the quencher according to the present invention is a quencher having a basic backbone represented by Formula 1. That is, not only the quenchers exemplified below, but also the compound having the basic backbone represented by Formula 1 should be understood as exhibiting the same or similar level of quenching effect, compared to a fluorescent material having a luminescent property at an excited energy level.

[Compound 1]
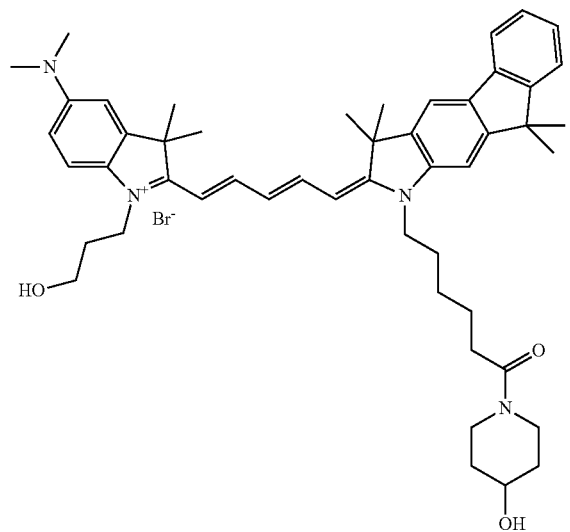
[Compound 2]
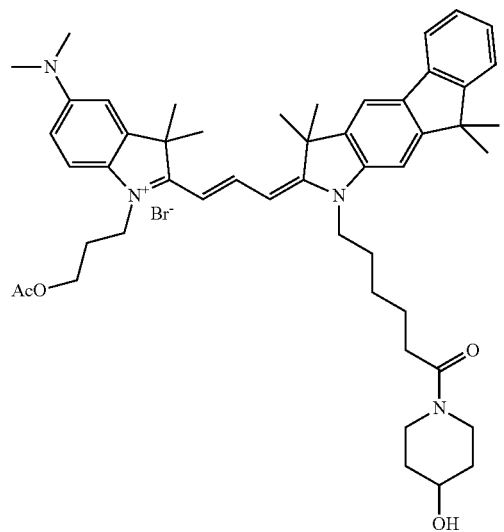
[Compound 3]
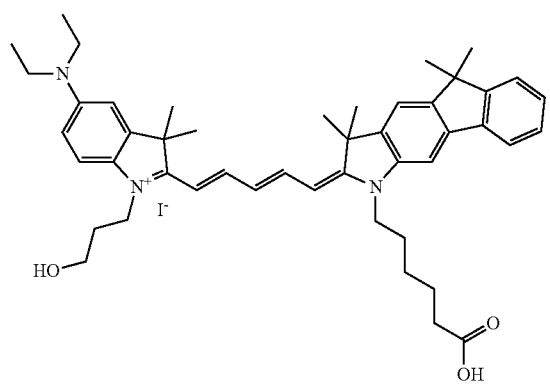
[Compound 4]
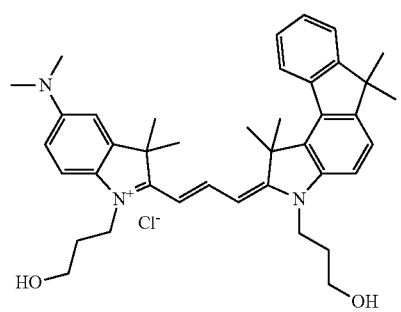
[Compound 5]
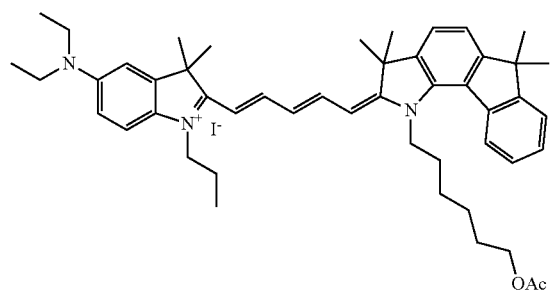
[Compound 6]
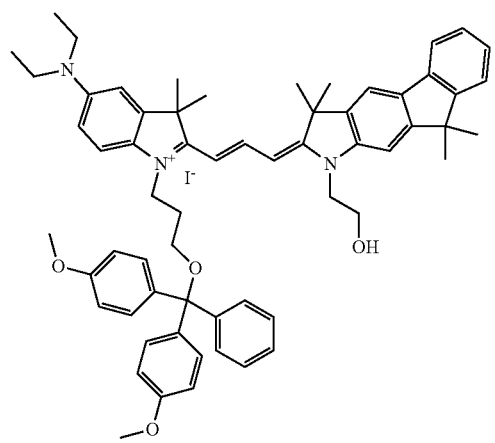

-continued
[Compound 7]
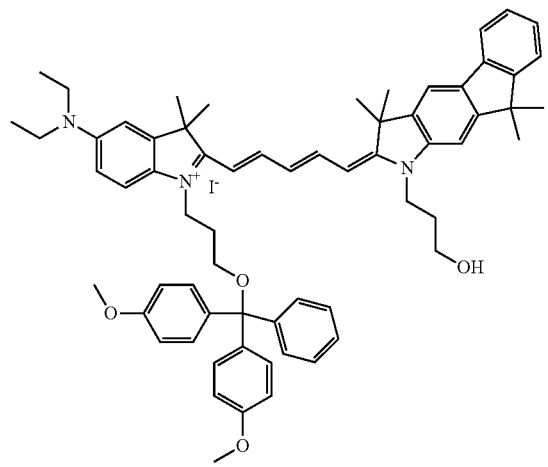
[Compound 8]
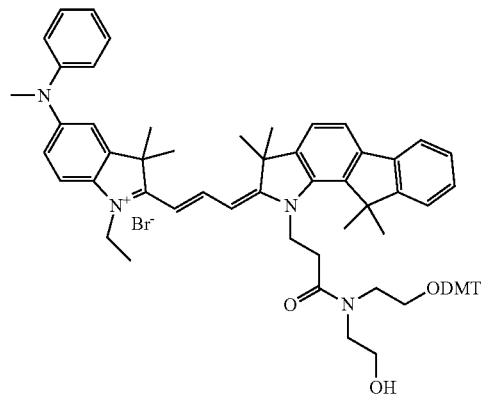
[Compound 9]
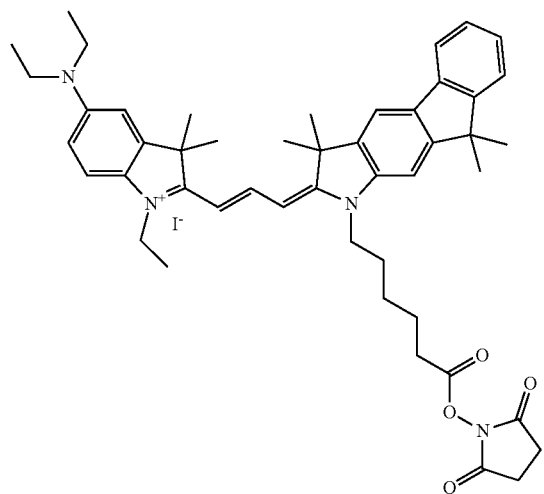
[Compound 10]
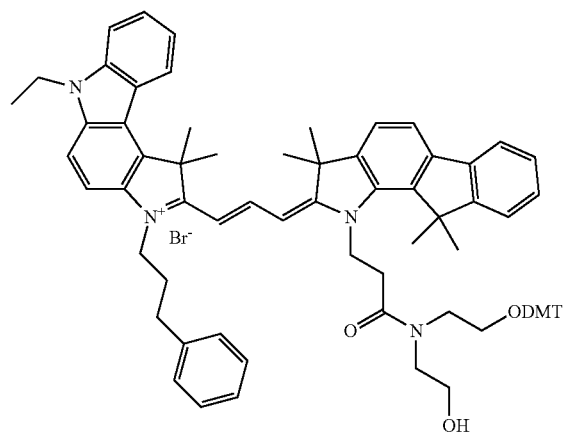
[Compound 11]
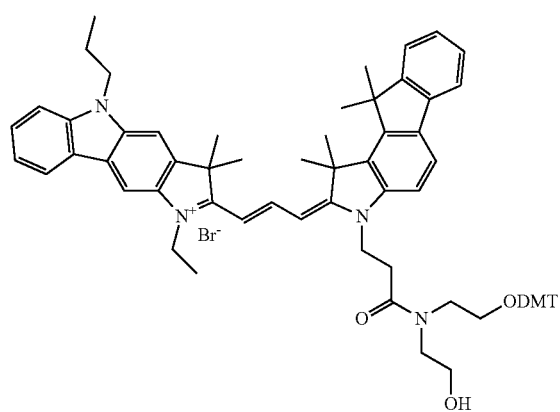
[Compound 12]

-continued
[Compound 13]
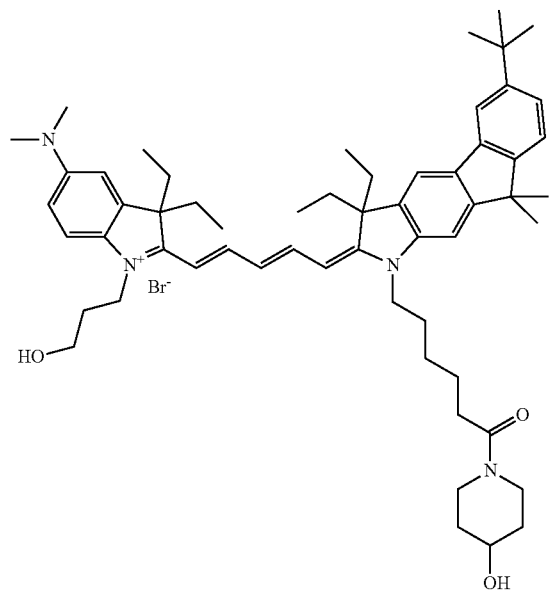
[Compound 14]
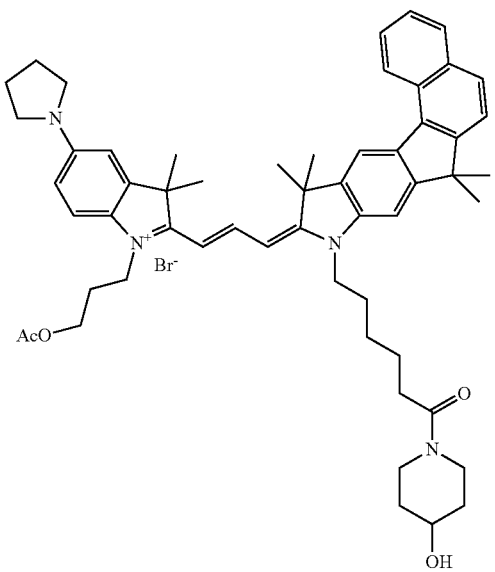
[Compound 15]
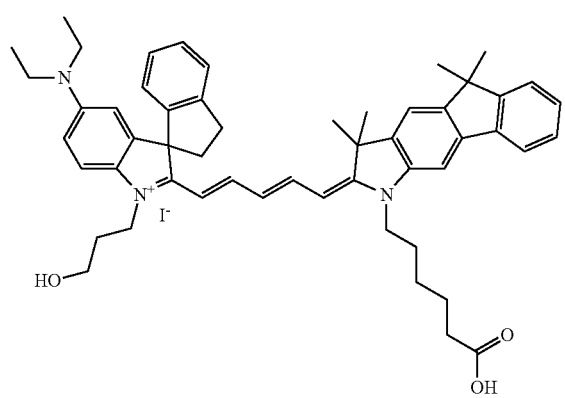
[Compound 16]
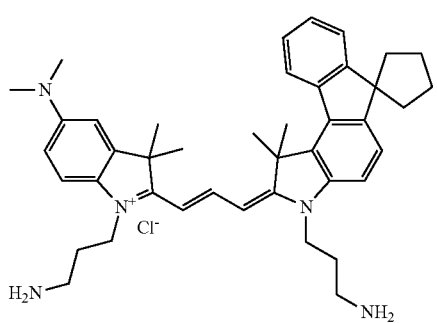
[Compound 17]
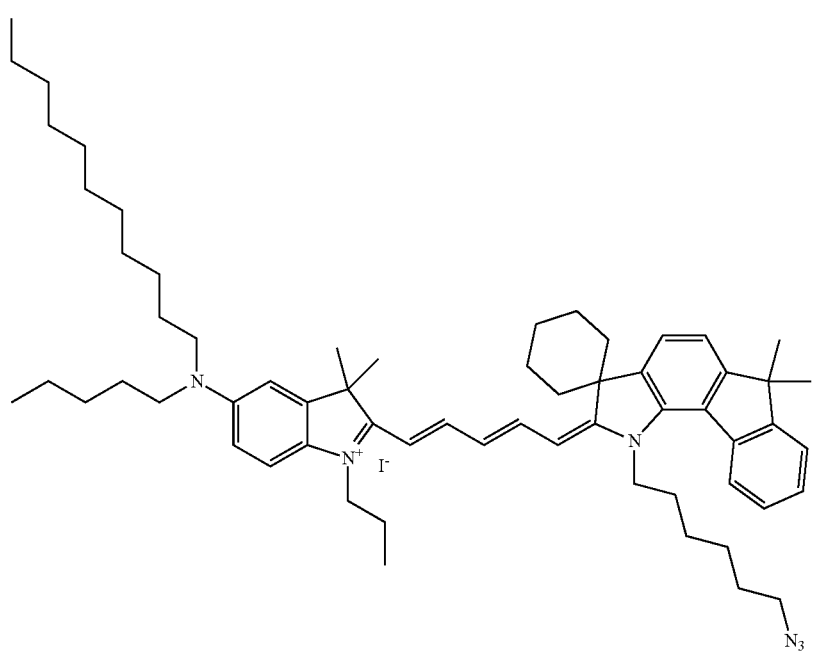

-continued
[Compound 18]
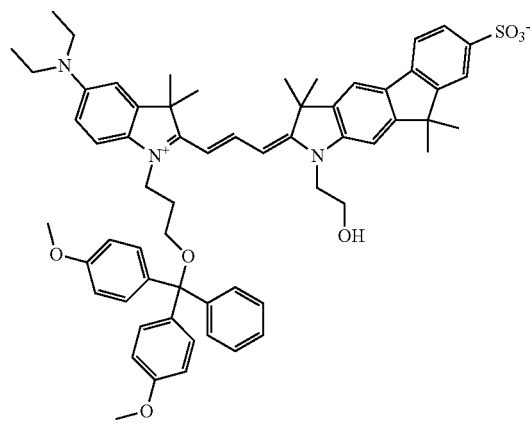
[Compound 19]
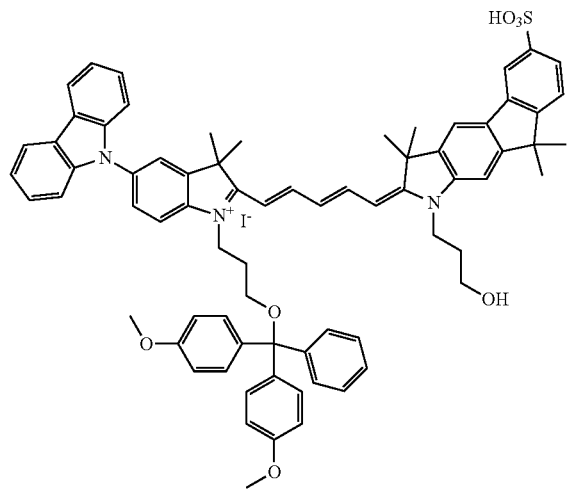
[Compound 20]
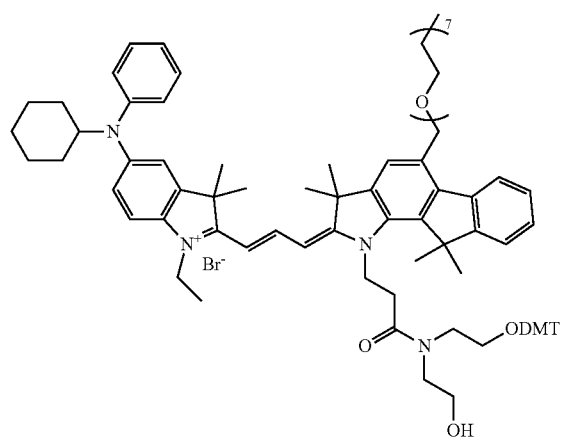
[Compound 21]
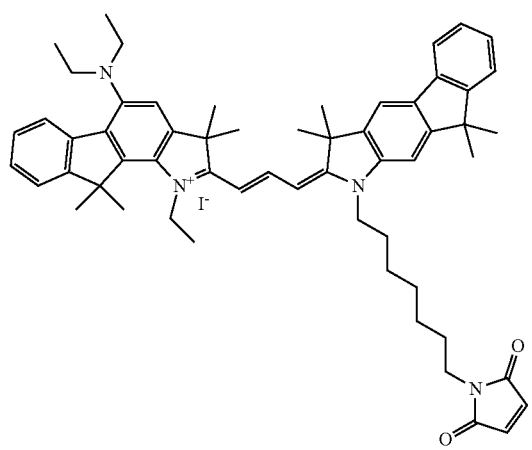

-continued

[Compound 22]

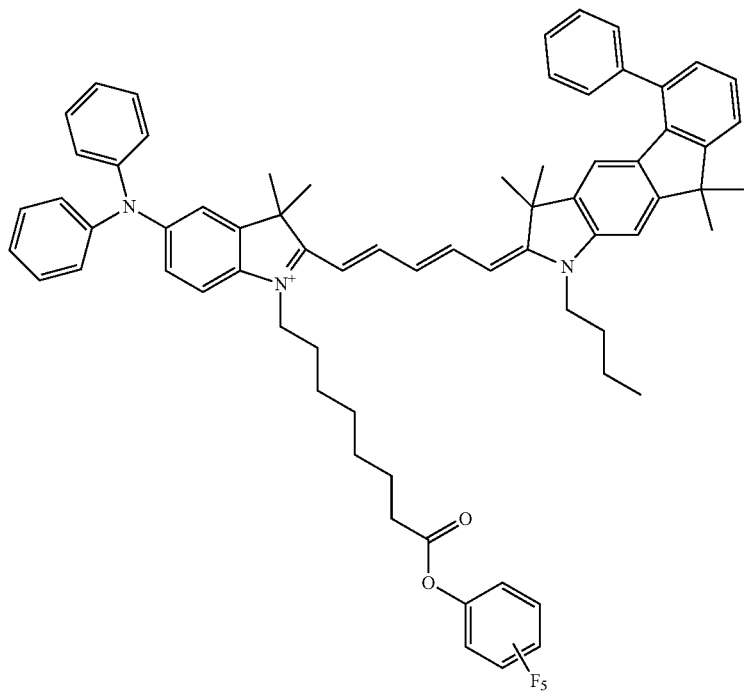

A biomolecule that is targeted by the quencher represented by Formula 1 disclosed herein may be at least one selected from an antibody, a lipid, a protein, a peptide, a carbohydrate, a nucleic acid (including a nucleotide).

Specific examples of the lipid include fatty acids, phospholipids, and lipopolysaccharides, and specific examples of the carbohydrate include monosaccharides, disaccharides, and polysaccharides (e.g., dextran).

Here, as a functional group for reacting with any functional group of the quencher represented by Formula 1 or a reactive group binding to the quencher represented by Formula 1, the biomolecule may include at least one selected from amino, sulfhydryl, carbonyl, hydroxyl, carboxyl, phosphate, and thiophosphate, or a derivative thereof.

In addition, the biomolecule may be an oxy or deoxy polynucleic acid including at least one selected from amino, sulfhydryl, carbonyl, hydroxyl, carboxyl, phosphate, and thiophosphate, or a derivative thereof.

Moreover, the quencher represented by Formula 1 may be used to label a drug containing at least one selected from amino, sulfhydryl, carbonyl, hydroxyl, carboxyl, phosphate, or thiophosphate, a hormone (including a receptor ligand), a receptor, an enzyme or an enzyme substrate, a cell, a cell membrane, a toxin, a microorganism, or a nano biomaterial (e.g., polystyrene microspheres), in addition to the biomolecule.

Oligonucleotide, Composition for Detecting Nucleic Acid and Support for Detecting Nucleic Acid, Including Novel Quencher According to another aspect of the present invention, an oligonucleotide including at least one selected from the quencher represented by Formula 1 is provided.

The oligonucleotide refers to a polymer of one to hundreds of nucleotides, and includes DNA, RNA, or PNA. In addition, such oligonucleotides include analogs thereof, for example, those with chemically modified nucleotides or those that are easily modified by those of ordinary skill in the art, such as those to which a sugar binds, and are single-stranded or double-stranded.

Such an oligonucleotide preferably includes a probe. Such a probe is more preferably a probe capable of complementarily binding to a targeted nucleic acid, but the present invention is not limited thereto. Here, the probe may be selected from a nucleic acid, a peptide, a saccharide, an oligonucleotide, a protein, an antibody, or a combination thereof, but the present invention is not limited thereto.

In one embodiment, the oligonucleotide may include a fluorophore. For example, the 5' end of the oligonucleotide may be labeled with a fluorophore, and the 3' end thereof may be labeled with at least one selected from quenchers represented by Formula 1. Between the 5' end and the 3' end, a probe capable of complementarily binding to a targeted nucleic acid may be positioned.

A fluorophore may refer to the types of the fluorophores disclosed in the following references (Cardullo et al., Proc. Natl. Acad. Sci. USA 85:8790-8794 (1988); Dexter, D. L., J. of Chemical Physics 21:836-850 (1953); Hochstrasser et al., Biophysical Chemistry 45:133-141 (1992); Selvin, P., Methods in Enzymology 246:300-334 (1995); Steinberg, I. Ann. Rev. Biochem., 40:83-114 (1971); Stryer, L. Ann. Rev. Biochem., 47:819-846 (1978); Wang et al., Tetrahedron Letters 31:6493-6496 (1990); and Wang et al., Anal. Chem. 67:1197-1203 (1995)).

In addition, non-limiting examples of the fluorophores that can be used in the present invention include 4-acetamido-4'-isothiocyanatostilbene-2,2'disulfonic acid, acridine and derivatives thereof, 5-(2'-aminoethyl)aminonaphthalene-1-sulfonic acid (EDANS), 4-amino-N-[3-vinylsulfonyl)phenyl]naphthalimide-3,5 disulfonate, N-(4-anilino-1-naphthyl) maleimide, anthranilamide, BODIPY, Brilliant Yellow, coumarins (7-amino-4-methylcoumarin (AMC, Coumarin 120), and 7-amino-4-trifluoromethylcouluarin (Coumaran 151)) and derivatives thereof, cyanine dyes, cyanosine, 4',6-diaminidino-2-phenylindole (DAPI), 5',5"-dibromopyrogallol-sulfonaphthalein (Bromopyrogallol Red), 7-diethylamino-3-(4'-isothiocyanatophenyl)-4-methylcoumarin, diethylenetriamine pentaacetate, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansylchloride), 4-(4'-dimethylaminophenylazo)benzoic acid (DABCYL), 4-dimethylaminophenylazophenyl-4'-isothiocyanate (DABITC), eosin and a derivative thereof (eosin isocyanate), erythrosine and derivatives thereof (erythrosine B, erythrosine isocyanate), ethidium, fluorescein and derivatives thereof (5-carboxyfluorescein (FAM)), 5-(4,6-dichlorotriazin-2-yl)aminofluorescein (DTAF), 2',7'-dimethoxy-4'5'-dichloro-6-carboxyfluorescein (JOE), QFITC (XRITC), fluorescamine, IR144, IR1446, Malachite Green isothiocyanate, 4-methylumbelliferone, ortho cresolphthalein, nitrotyrosine, pararosaniline, Phenol Red, B-phycoerythrin, o-phthaldialdehyde, pyrene and derivatives thereof (pyrene butyrate, succinimidyl 1-yprene butyrate), quantum dots, Reactive Red 4 (Cibacron Brilliant Red 3B-A), rhodamine and derivatives thereof (6-carboxy-X-rhodamine, 6-carboxyrhodamine, rhodamine B, rhodamine 123, rhodamine X isocyanate, sulforhodamine B, sulforhodamine 101, tetramethyl rhodamine, and tetramethyl rhodamine isocyanate), riboflavin, rosolic acid, pyrene, carbopyronin, oxazine, xanthene, thioxanthene, and terbium chelate derivatives.

In addition, the oligonucleotide according to the present invention may further include a minor groove binder (MGB) to improve the binding strength with a nucleic acid.

Such an oligonucleotide may be used in various ways in chemical and biological fields. Particularly, it may be useful for real time PCR or microassay, but the present invention is not limited thereto.

In addition, according to another aspect of the present invention, a composition for detecting a nucleic acid, including the oligonucleotide, is provided.

The composition for detecting a nucleic acid according to one embodiment of the present invention may further include an enzyme, a solvent (buffer or the like) and other reagents for a reaction with a target biomolecule as well as an oligonucleotide including all of a quencher represented by Formula 1, MGB and a fluorophore.

Here, as the solvent, a buffer selected from the group consisting of a phosphate buffer, a carbonate buffer and a Tris buffer, an organic solvent selected from dimethyl sulfoxide, dimethylformamide, dichloromethane, methanol, ethanol and acetonitrile, or water may be used, and it is possible to adjust solubility by introducing various functional groups to the quencher according to the type of solvent.

In addition, according to still another aspect of the present invention, a support for detecting a nucleic acid, which includes the quencher represented by Formula 1, a support, and a linker connecting the quencher and the support, is provided.

Accordingly, a biomolecule in a sample may be fixed on a supporting matrix through interaction with the quencher adhered onto the support.

The supporting matrix may be manufactured with at least one selected from glass, cellulose, nylon, acrylamide gel, dextran, polystyrene, alginate, collagen, peptides, fibrin, hyaluronic acid, agarose, polyhydroxyethylmethacrylate, polyvinyl alcohol, polyethylene glycol, polyethyleneoxide, polyethylene glycol diacrylate, gelatin, Matrigel, polylactic acid, carboxymethylcellulose, chitosan, latex, and sepharose, and may be formed as a bead or a membrane.

Here, the linker, as a part connecting the quencher and the support, and any material capable of connecting the quencher and the support may be used as a linker intended by the present invention.

For example, the linker may be selected from substituted or unsubstituted $C_1$-$C_{30}$ alkyl, substituted or unsubstituted $C_2$-$C_{30}$ heteroalkyl having at least one hetero atom, substituted or unsubstituted $C_6$-$C_{30}$ aryl, and substituted or unsubstituted $C_3$-$C_{30}$ heteroaryl, and more specifically, is a chain in which 1 to 6 ethylene glycols are connected.

Such a linker merely connects the quencher and the support, and does not affect other reactions of the quencher or fluorophore, or fluorescent and quenching actions.

Method of Detecting Nucleic Acid

According to one embodiment of the present invention, a method of labeling a target nucleic acid through reaction with a quencher-labeled probe may be implemented. In addition, a biomolecule labeling method using a target-specific interaction may be implemented by introducing an appropriate reactive group to a quencher according to the type of target biomolecule. Moreover, a method of identifying the quencher-labeled biomolecule through electrophoresis may be implemented.

Dna Microarray

A DNA microarray is for measuring the fluorescence of a target nucleic acid by preparing a single-stranded probe nucleic acid which labels a target nucleic acid through reaction with a dye and has a complementary base sequence to the target nucleic acid, and hybridizing the probe nucleic acid with the target nucleic acid denatured into a single strand on a substrate.

In the labeling method, when gene expression is investigated, as the probe nucleic acid immobilized to the substrate, cDNA, which is prepared by amplifying a cDNA library, genome library, or any of all genomes as a template through PCR, may be used.

In addition, for investigation of a gene mutation, various oligonucleotides corresponding to mutations may be synthesized based on a known sequence serving as a reference and used.

A proper method for immobilizing the probe nucleic acid on the substrate May be selected according to the type of nucleic acid or substrate. For example, a method for electrostatic bonding to a substrate surface-treated with a cation such as polylysine using the charge of DNA may also be used.

The target nucleic acid denatured into a single strand is immobilized on the substrate, and hybridized with the oligonucleotide. Here, the 5'end of the oligonucleotide is labeled with a fluorophore, and the 3'end thereof is labeled with at least one selected from quenchers represented by Formula 1. Between the 5' end and the 3' end, a probe that is able to complimentarily bind to the targeted nucleic acid may be positioned.

Hybridization is preferably performed at room temperature to 70° C. for approximately 2 to 48 hours. The target nucleic acid having a complementary base sequence with the probe nucleic acid is selectively bound with the probe nucleic acid through hybridization. Afterward, the substrate is washed and dried at room temperature.

Here, the oligonucleotide is hybridized to the target nucleic acid by the probe, but the fluorophore at the 5' end is present in a quenched state by the quencher at the 3' end.

Subsequently, the oligonucleotide hybridized to the target nucleic acid is elongated by a polymerase and separated

23 from the target nucleic acid by the exonuclease activity of the polymerase and degraded. The fluorophore at the 5' end of the oligonucleotide and the quencher at the 3' end are separated from each other, and thus the fluorophore exhibits fluorescence.

Here, the intensity of the generated fluorescence is measured to measure the amplification amount of the target nucleic acid.

Hereinafter, specific examples of the present invention are suggested. However, the following examples are only for exemplifying or explaining the present invention in detail, and the present invention should not be limited thereto.

Preparation Example 1. Synthesis of Compound 1

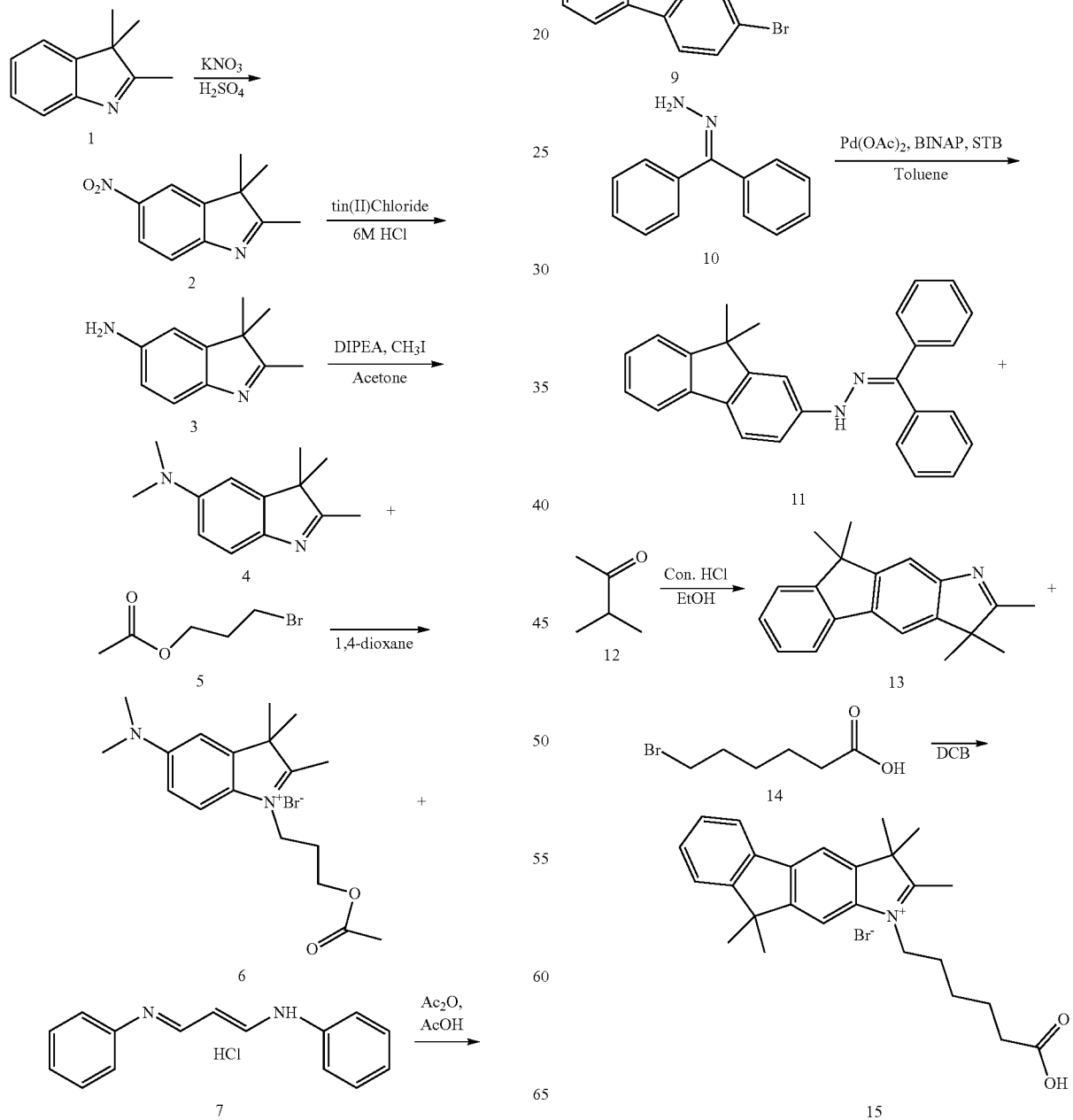

-continued

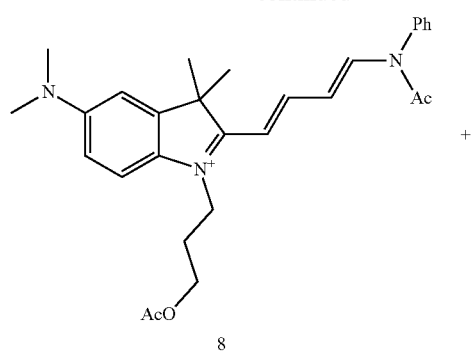

8

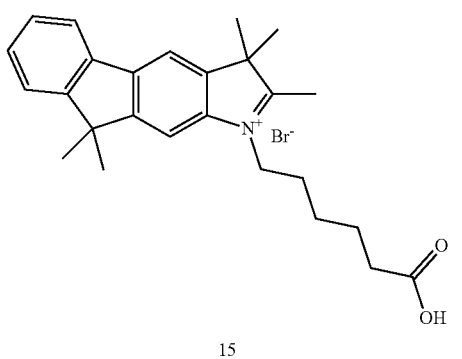

15

Ac₂O, Pyridine reflux

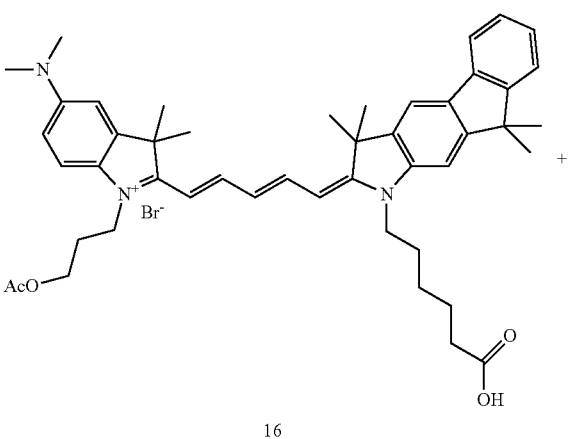

16

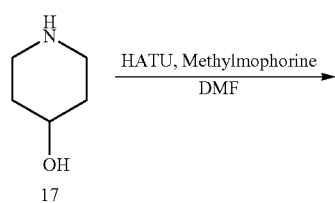

17

HATU, Methylmophorine
―――――――――→
DMF

-continued

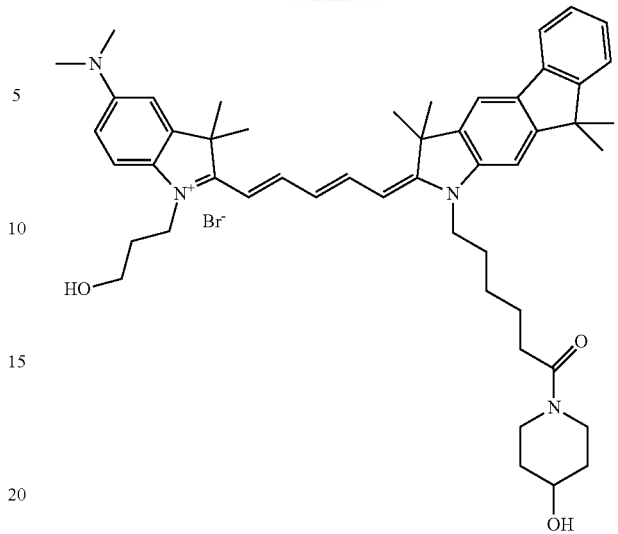

18

Synthesis of Intermediate 2

2,3,3-trimethylindolenine (30 g, 0.188 mol) and 120 ml of sulfuric acid were added to a 500 mL 1-neck reactor, and stirred at 0° C. A solution in which KNO₃ (19.0 g, 0.188 mmol) and sulfuric acid (120 mL) are mixed was added dropwise at 0° C. After 1 hour, ice was added, and the resulting solution was neutralized with NaOH(aq). Subsequently, the resulting solid was filtered and dried.

Synthesis of Intermediate 3

Intermediate 2 (36.3 g, 0.178 mol) and 950 ml of 6M HCl were added to a 2 L reactor, and stirred. Tin (II) chloride dehydrate (240.6 g, 1.066 mol) was added and stirred at 100° C. for 2 hours. After the reaction was completed, the resulting mixture was cooled to room temperature and neutralized with NaOH. Subsequently, extraction was performed with MC and water, followed by concentration and drying.

Synthesis of Intermediate 4

Intermediate 3 (5.0 g, 0.029 mol), DIPEA (14.8 g, 0.115 mol), CH₃I (12.2 g, 0.086 mol), and 50.0 ml acetone were added to a reactor, and stirred for 3 days. Subsequently, extraction was performed with MC and water, followed by concentration and column purification (HEP:EA=4:1).

Synthesis of Intermediate 6

Intermediate 4 (1.4 g, 0.007 mol) and Intermediate 5 (1.5 g, 0.008 mol) were dissolved in dioxane (14 ml) in a reactor, and stirred under reflux for 14 hours. Subsequently, the solvent was concentrated, followed by column purification.

Synthesis of Intermediate 8

Intermediate 6 (1 g, 0.003 mol), malonaldehyde dianilide hydrochloride (0.7 g, 0.003 mol), citric acid (2 mL), and acetic anhydride (10 mL) were added to a 100 mL 1-neck reactor and stirred at 100° C. for 1 hour. Subsequently, a solid was precipitated with ethyl acetate, followed by column purification (MC:MeOH=50:1).

Synthesis of Intermediate 11

Intermediate 9 (100 g, 0.366 mol), Intermediate 10 (86.2 g, 0.439 mol), Pd(OAc)₂ (8.2 g, 0.037 mol), BINAP (22.8 g, 0.037 mol), STB (49.3 g, 0.513 mol), and 1000 ml of toluene were added to a reactor, and stirred under reflux. The resulting mixture was confirmed by TLC, and cooled to room temperature. Subsequently, after concentration, extraction was performed with MC/H₂O, followed by column purification.

Synthesis of Intermediate 13

Intermediate 11 (100 g, 0.257 mol) and Intermediate 12 (44.3 g, 0.514 mol), 250 ml of Con. HCl, and 800 ml of ethanol were added to a reactor, stirred under reflux overnight. The resulting mixture was confirmed by TLC and then cooled to room temperature. Subsequently, a solid was precipitated with ethyl acetate, filtered and dried.

Synthesis of Intermediate 15

Intermediate 13 (10.0 g 0.036 mol), Intermediate 14 (8.5 g, 0.044 mol), and 20 ml of DCB were added to a reactor, and stirred under reflux overnight. A solid was precipitated with ethyl acetate, filtered and dried.

Synthesis of Intermediate 16

Intermediate 8 (2.0 g, 0.005 mol), Intermediate 15 (3.3 g, 0.005 mmol), acetic anhydride (0.9 ml, 9.71 mmol), and pyridine (40 mL) were added to a reactor, and stirred under reflux for 2 hours. Subsequently, concentration was performed, followed by column purification.

Synthesis of Compound 1 (18)

Intermediate 16 (500 mg, 0.726 mmol) and Intermediate 17 (110.1 mg, 1.089 mmol), HATU (331.1 mg, 0.871 mmol), methylmophorine (220.2 mg, 2.177 mmol), and DMF (10 ml) were added to a reactor and stirred at room temperature. Subsequently, extraction was performed with MC and water, followed by column purification.

Preparation Example 2. Synthesis of Compound 2

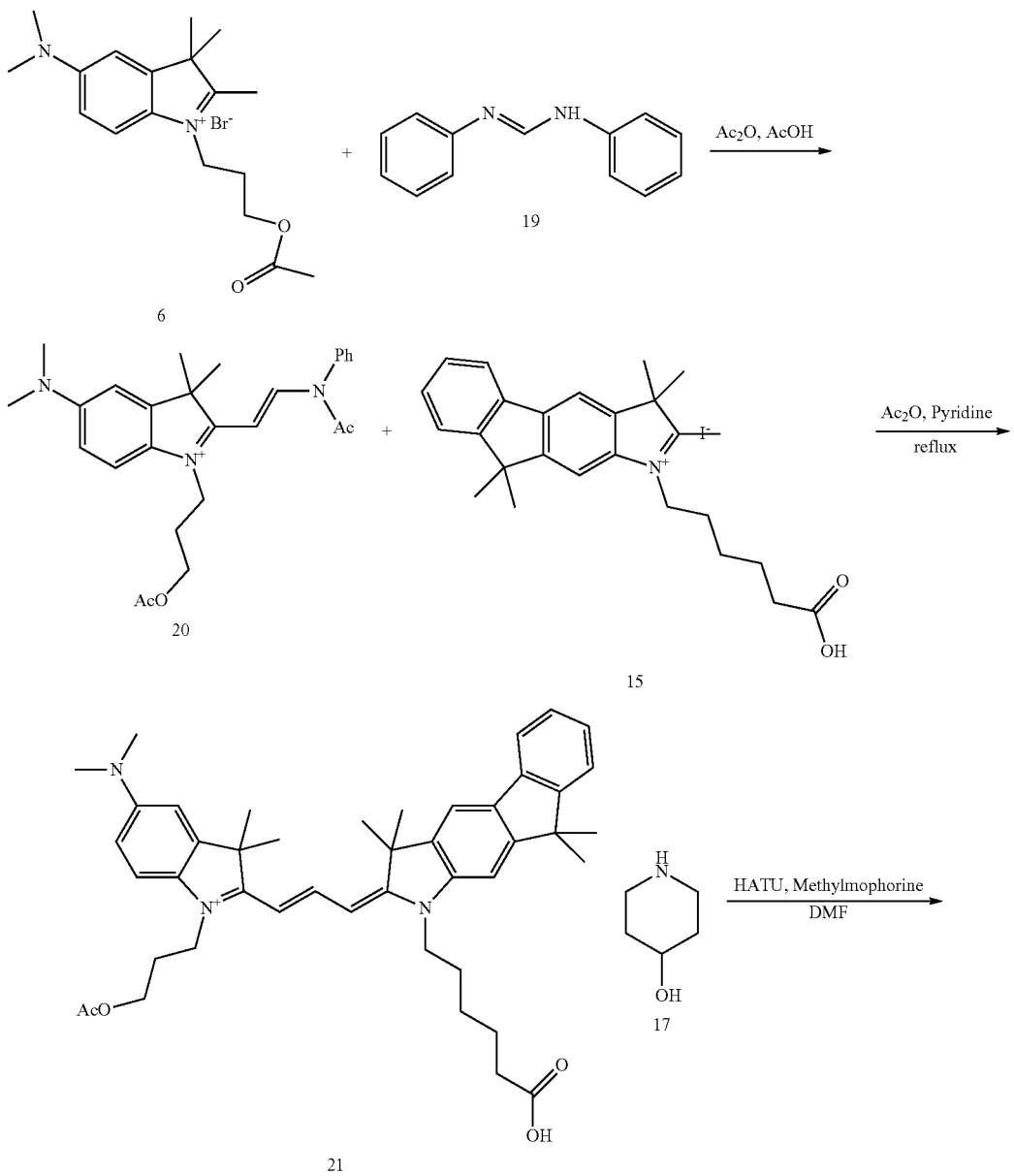

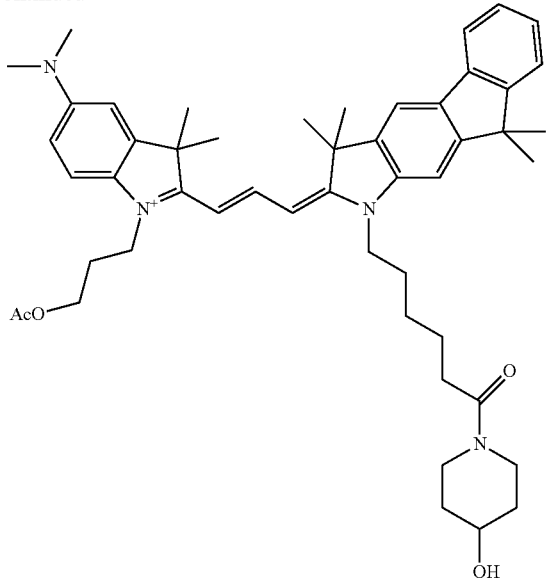

22

Synthesis of Intermediate 20

Intermediate 6 (10.0 g, 0.026 mol), Intermediate 19 (5.6 g, 0.029 mol), citric acid (5 mL), and acetic anhydride (15 mL) were added to a reactor, and stirred at 100° C. for 1 hour. Subsequently, a solid was precipitated with ethyl acetate, followed by column purification (MC:MeOH=50:1).

Synthesis of Intermediate 21

Intermediate 8 (2.0 g, 0.004 mol), Intermediate 15 (2.3 g, 0.004 mmol), acetic anhydride (0.9 ml, 9.71 mmol), and pyridine (40 mL) were added to a reactor, and stirred under reflux for 2 hours. Subsequently, concentration was performed, followed by column purification.

Synthesis of Compound 2 (22)

Intermediate 16 (500 mg, 0.726 mmol) and Intermediate 17 (107.9 mg, 1.067 mmol), HATU (324.5 mg, 0.854 mmol), methylmophorine (215.8 mg, 2.134 mmol), and DMF (10 ml) were added to a reactor, and stirred at room temperature. Subsequently, extraction was performed with MC and water, followed by column purification.

Preparation Example 3. Synthesis of Compound 6

-continued

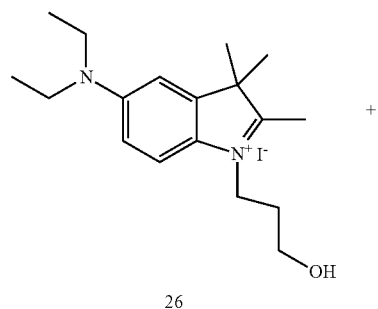

26

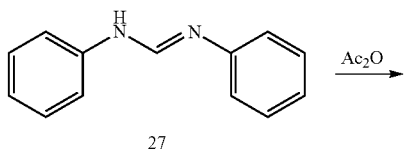

27

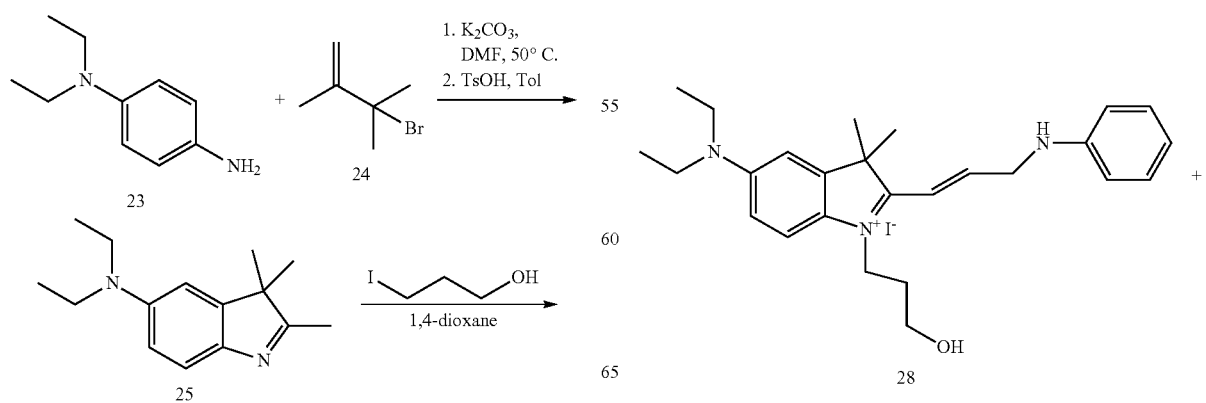

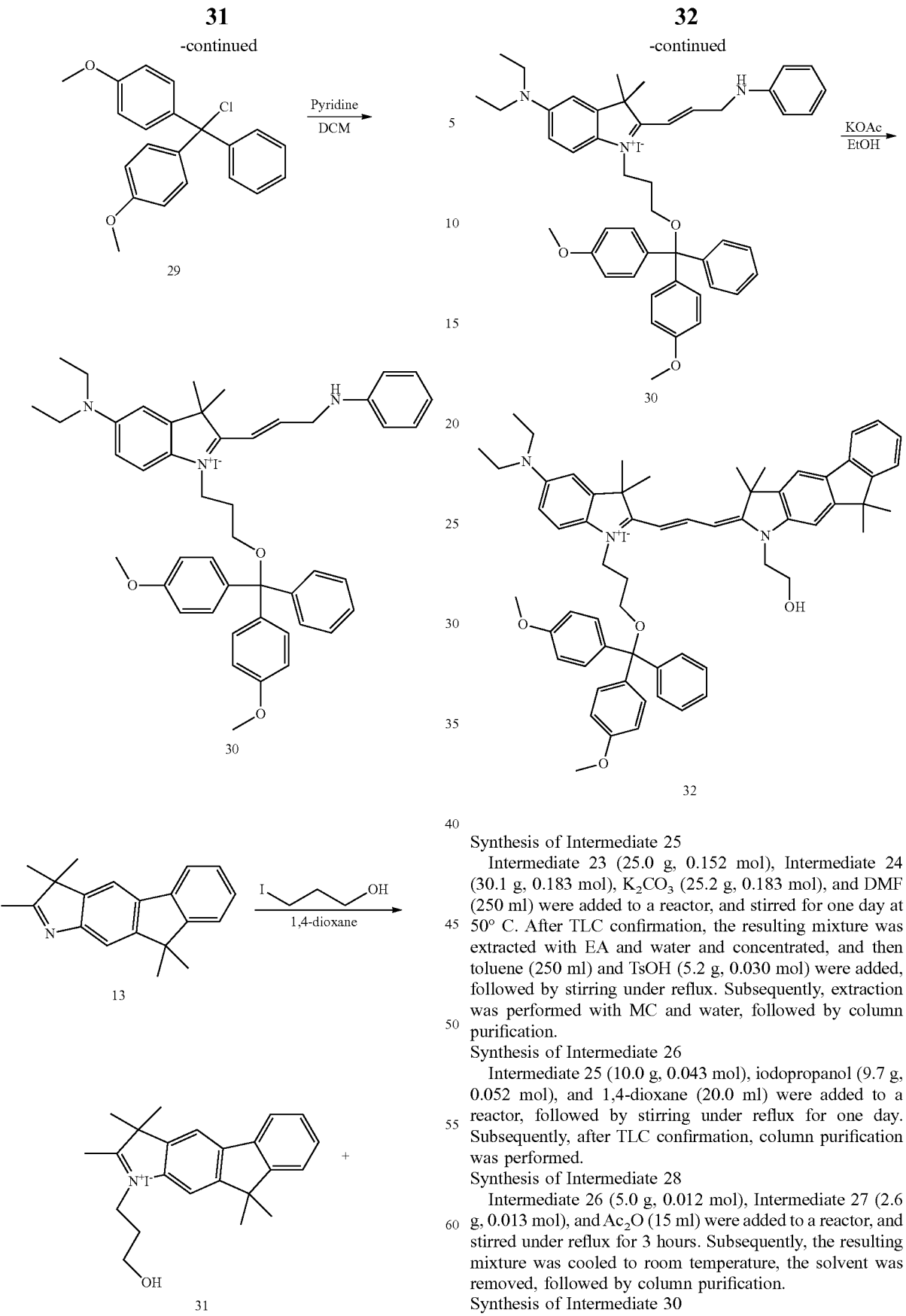

Synthesis of Intermediate 25

Intermediate 23 (25.0 g, 0.152 mol), Intermediate 24 (30.1 g, 0.183 mol), K$_2$CO$_3$ (25.2 g, 0.183 mol), and DMF (250 ml) were added to a reactor, and stirred for one day at 50° C. After TLC confirmation, the resulting mixture was extracted with EA and water and concentrated, and then toluene (250 ml) and TsOH (5.2 g, 0.030 mol) were added, followed by stirring under reflux. Subsequently, extraction was performed with MC and water, followed by column purification.

Synthesis of Intermediate 26

Intermediate 25 (10.0 g, 0.043 mol), iodopropanol (9.7 g, 0.052 mol), and 1,4-dioxane (20.0 ml) were added to a reactor, followed by stirring under reflux for one day. Subsequently, after TLC confirmation, column purification was performed.

Synthesis of Intermediate 28

Intermediate 26 (5.0 g, 0.012 mol), Intermediate 27 (2.6 g, 0.013 mol), and Ac$_2$O (15 ml) were added to a reactor, and stirred under reflux for 3 hours. Subsequently, the resulting mixture was cooled to room temperature, the solvent was removed, followed by column purification.

Synthesis of Intermediate 30

Intermediate 28 (1.3 g, 0.003 mol) and pyridine (13 ml) were added to a reactor, and stirred at room temperature. Intermediate 29 (1.0 g, 0.003 mol) was added to MC (13 ml), and stirred for one day at room temperature. Subsequently, the solvent was concentrated, followed by column purification.

Synthesis of Intermediate 31

Intermediate 13 (10.0 g, 0.036 mol), iodopropanol (6.8 g, 0.036 mol), and 1,4-dioxane (50 ml) were added to a reactor, and stirred under reflux for one day. Subsequently, the solvent was removed, followed by column purification.

Synthesis of Compound 6 (32)

Intermediate 30 (1.1 g, 0.001 mol), Intermediate 31 (0.6 g, 0.001 mol), KOAc (0.2 g, 0.002 mol), and ethanol (22 ml) were added to a reactor, and stirred under reflux for one day. Subsequently, the resulting mixture was cooled to room temperature, and the solvent was concentrated, followed by column purification.

Preparation Example 4. Synthesis of Compound 7

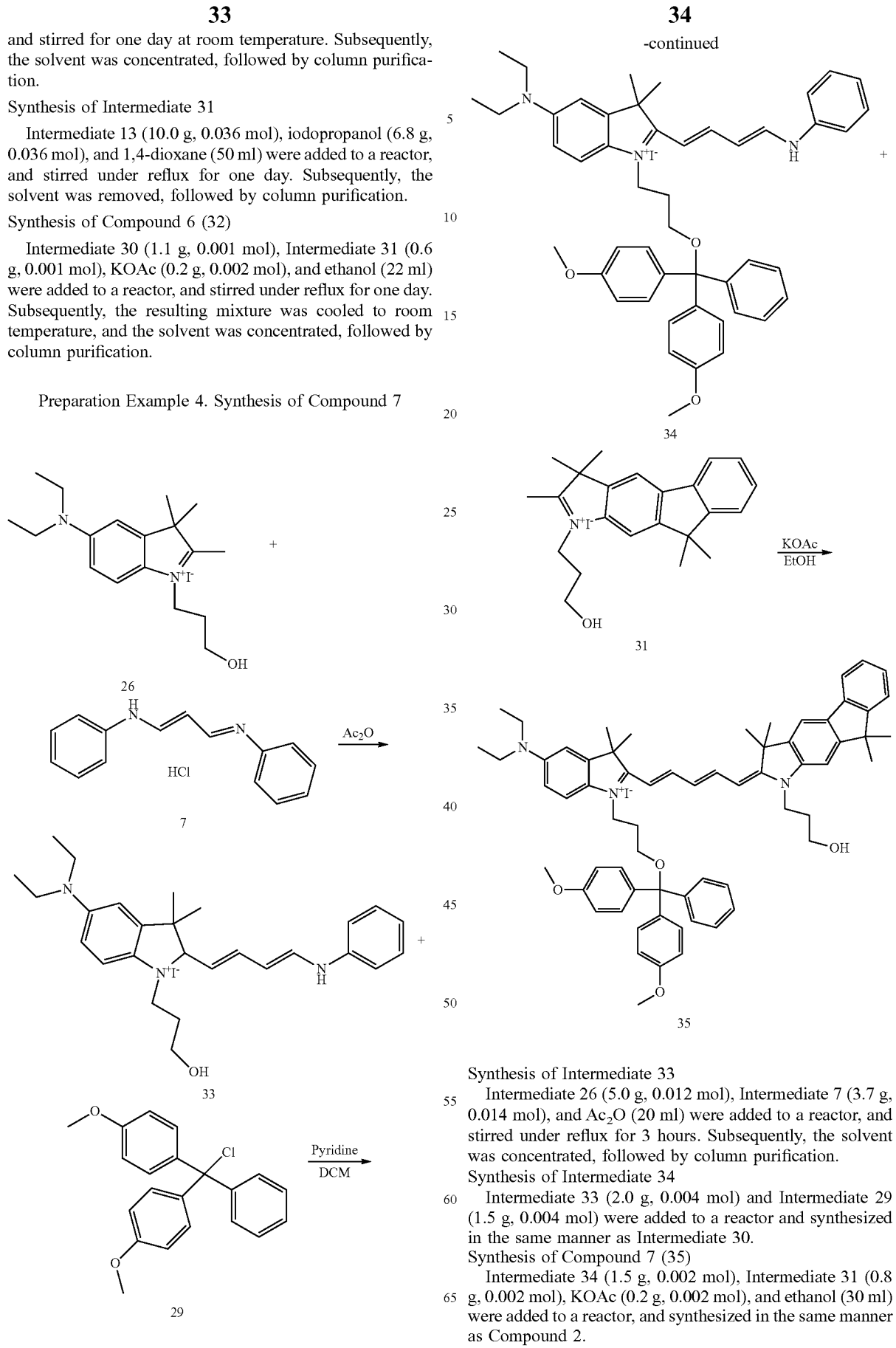

Synthesis of Intermediate 33

Intermediate 26 (5.0 g, 0.012 mol), Intermediate 7 (3.7 g, 0.014 mol), and Ac$_2$O (20 ml) were added to a reactor, and stirred under reflux for 3 hours. Subsequently, the solvent was concentrated, followed by column purification.

Synthesis of Intermediate 34

Intermediate 33 (2.0 g, 0.004 mol) and Intermediate 29 (1.5 g, 0.004 mol) were added to a reactor and synthesized in the same manner as Intermediate 30.

Synthesis of Compound 7 (35)

Intermediate 34 (1.5 g, 0.002 mol), Intermediate 31 (0.8 g, 0.002 mol), KOAc (0.2 g, 0.002 mol), and ethanol (30 ml) were added to a reactor, and synthesized in the same manner as Compound 2.

Preparation Example 5. Synthesis of Compound 9

Scheme

Left Part

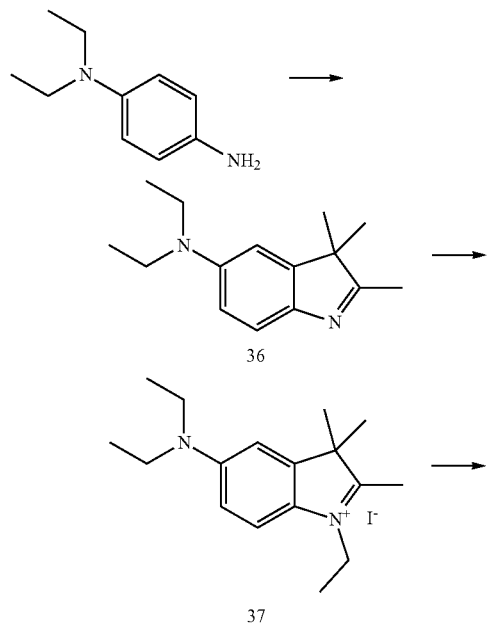

Right Part

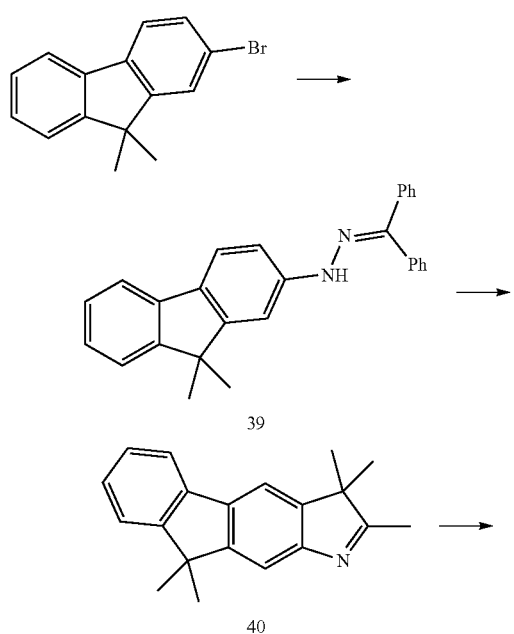

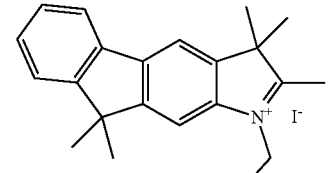

41

Condensation

Left + Right ⟶

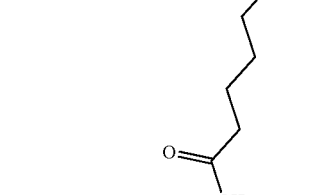

42

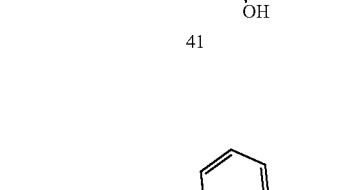

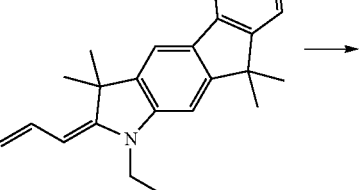

43

Synthesis of Intermediate 36

N,N-diethyl-1,4-phenylenediamine (25 g, 0.152 mol), 3-bromo-3-methyl-2-butanone (30.1 g, 0.183 mol), potassium carbonate (25.2 g, 0.183 mol), and dimethylformamide (250 mL) were added to a 500 mL 1-neck reactor, and stirred at 50° C. for 12 hours. Water (100 mL) was added to the reactor, vigorously stirred, followed by extraction with ethyl acetate (100 mL×2). Anhydrous magnesium sulfate was added to an organic layer and stirred for 5 minutes, followed by filtration of a solid. The filtrate was concentrated, and p-toluenesulfonic acid (5.2 g, 0.03 mol) and toluene (250 mL) were added to the concentrate and stirred under reflux for 12 hours. Water (100 mL) was added to the reactor, vigorously stirred, followed by extraction with ethyl acetate (100 mL×2). Anhydrous magnesium sulfate was added to an organic layer and stirred for 5 minutes, followed by filtration of a solid. Subsequently, the filtrate was concentrated, followed by column purification.

Synthesis of Intermediate 37

Intermediate 36 (4.46 g, 0.0194 mol), iodomethane (4.53 g, 0.029 mol), and acetonitrile (45 mL) were added to a 100 mL 1-neck reactor, and stirred under reflux for 12 hours. Subsequently, concentration was performed, followed by column purification.

Synthesis of Intermediate 38

Intermediate 37 (2.73 g, 7.066 mmol), N,N'-diphenylformamidine (1.53 g, 7.774 mmol), and acetic anhydride (25 mL) were added to a 100 mL 1-neck reactor, and stirred at 110° C. for 1 hour. Subsequently, concentration was performed, followed by column purification.

Synthesis of Intermediate 39

Bromo-9,9-diemthylfluorene (25 g, 0.0915 mol), benzophenolhydrazine (21.55 g, 0.109 mol), Pd2 (dba) 3 (3.35 g, 3.660 mmol), BINAP (2.28 g, 3.66 mmol), sodium-tert-butoxide (12.31 g, 0.128 mol), and toluene (250 mL) were added to a 500 mL 3-neck reactor and stirred at 100° C. for 12 hours. A solid was filtered through Celite in a hot state. Subsequently, concentration was performed, followed by column purification.

Synthesis of Intermediate 40:44

Intermediate 39 (32.4 g, 0.0834 mol), 3-methyl-2-butanone (22.5 g, 0.250 mol), thick hydrochloric acid (80 mL), and ethanol (330 mL) were added to a 500 mL 1-neck reactor and stirred under reflux for 12 hours. After concentration, water (500 mL) was added to the reactor, and extraction was performed with ethyl acetate (500 mL×2). Anhydrous magnesium sulfate was added to an organic layer, stirred for 5 minutes, followed by filtration of a solid. Subsequently, the filtrate was concentrated, followed by column purification.

Synthesis of Intermediate 41

Intermediate 40 (2 g, 7.262 mmol), 6-iodine hexanoic acid (2.63 g, 10.893 mmol), and 1,4-dioxane (20 mL) were added to a 100 mL 1-neck reactor and stirred under reflux for 12 hours. Subsequently, after cooling, ethyl acetate (100 mL) was added to the reactor for crystallization, and then a solid was filtered.

Synthesis of Intermediate 42

Intermediate 38 (2.46 g, 4.638 mmol), Intermediate 41 (1.2 g, 2.319 mmol), and pyridine (25 mL) were added to a 100 mL 1-neck reactor and stirred at 80° C. for 2 hours. Subsequently, concentration was performed, followed by column purification.

Synthesis of Compound 9 (43)

Intermediate 42 (700 mg, 0.89 mmol), N,N'-dicyclohexylcarboimide (220 mg, 1.068 mmol), N-hydroxysuccinimide (123 mg, 1.068 mmol), and dichloromethane (20 mL) were added to a 100 mL 1-neck reactor and stirred at room temperature for 1 hour. The resulting solid was purified, followed by column purification.

$^1$H-NMR (300 MHz, CDCl$_3$) δ 8.37 (t, 1H, J=13.5 Hz), 7.71 (d, 1H, J=7.5 Hz), 7.62 (s, 1H), 7.44-7.26 (m, 4H), 7.09-7.06 (m, 3H), 6.68-6.66 (m, 2H), 4.36 (q, 2H, J=7.2 Hz), 4.20 (t, 2H, J=7.8 Hz), 3.43 (q, 4H, J=7.2 Hz), 2.85 (s, 4H), 2.72 (t, 2H, J=7.2 Hz), 1.96-1.91 (m, 4H), 1.76 (s, 6H), 1.73 (s, 6H), 1.60 (m, 2H), 1.53 (s, 6H), 1.25 (t, 9H, J=6.3 Hz)

Preparation Example 6. Synthesis of Quencher-CPG

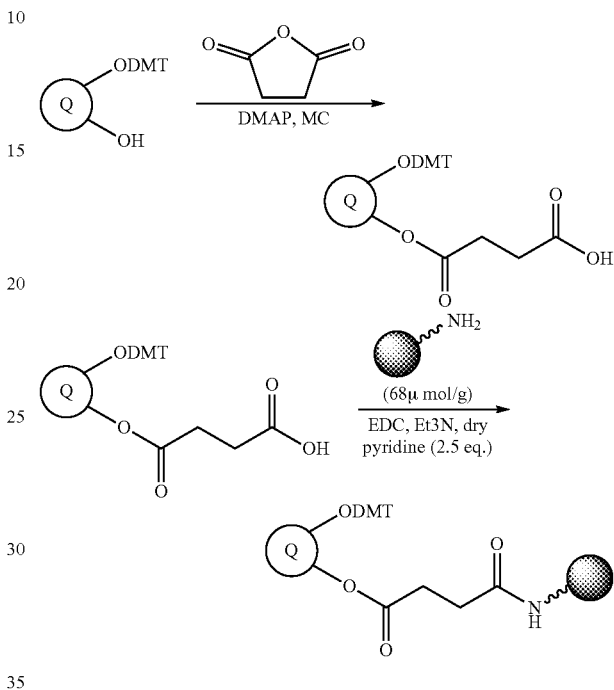

Compound 2 (75 mg, 0.11 mmol), succinic anhydride (9.9 mg, 0.099 mmol), 4-dimethylaminopyrimidine (12.1 mg, 0.099 mmol), and dichloromethane (5 ml) were added to a 10 mL vial and rolled at room temperature for 1.5 hours. After complete concentration, 1-ethyl-3-(3-dimethylamino-proly) carbodiimide (52.7 mg, 0.275 mmol), triethylamine (28 µl), pyridine (5 ml), and CPG-NH2 (1 g) were added, followed by rolling at room temperature for 2 hours. A powder was filtered and washed three times each with acetonitrile, methanol and dichloromethane. After drying, CapA/CapB=1 ml/1 ml was added and rolled at room temperature for 2 hours, and the resulting product was washed three times each with acetonitrile and dichloromethane, and then dried. In addition, Compound6-CPG, Compound7-CPG and Compound 9-CPG were synthesized in the same manner as described above.

Experimental Example 1. Measurement of Quenching Property of Compound 2

Synthesis of Double-Labeled Oligonucleotide

A double-labeled oligonucleotide was synthesized using Compound 2-CPG synthesized in Preparation Example 6 and CalfluorRed® 610 by a 10-Column Polygen DNA Synthesizer. The synthesized double-labeled oligonucleotide was subjected to cleavage and deprotection by general methods, followed by purification through RP HPLC. The sequence of the double-labeled synthetic oligonucleotide is shown in Table 1 below.

TABLE 1

| 5' fluorophore | Probe sequence | 3' quencher |
|---|---|---|
| CalfluorRed® 610 | AGC CTT TCT AAC CGC TGC ACT TAC CCT T | Compound 2 |

Measurement of Quenching Property

To confirm the quenching property of the double-labeled probe of Table 1, real time PCR was performed with the composition shown in Table 2 below (Biorad, using CFX-96). The result of real time PCR is shown in FIG. 1 (PCR Protocol: 95° C., 3 min [95° C., 10 s–60° C., 30 s]×50 cycles).

TABLE 2

| Classification | Content (μl) |
|---|---|
| Master Mix (Biolin Probe Master Mix (2X)) | 20 μl |
| Primer | 10 pmole each |
| CalfluorRed ®610-Compound 2 probe | 5 pmole |
| Template | Hyman gDNA 1 ng & Target plasmid 100 fg |
| PCR water | up to 40 μl |

Referring to FIG. 1 showing the result of real time PCR of the double-labeled probe consisting of CalfluorRed® 610 and Compound 2 as a fluorophore and a quencher, respectively, it can be confirmed that Compound 2 effectively quenches the fluorescence of CalfluorRed® 610 and PCR amplification was also carried out with an ideal pattern.

Experimental Example 2. Measurement of Quenching Property of Compound 6

Synthesis of Double-Labeled Oligonucleotide

A double-labeled oligonucleotide was synthesized using Compound 6-CPG synthesized in Preparation Example 6 and CalfluorRed® 610 by a 10-Column Polygen DNA Synthesizer. The synthesized double-labeled oligonucleotide was subjected to cleavage and deprotection by general methods, followed by purification through RP HPLC. The sequence of the double-labeled synthetic oligonucleotide is shown in Table 3 below.

TABLE 3

| 5' fluorophore | Probe sequence | 3' quencher |
|---|---|---|
| CalfluorRed® 610 | AGC CTT TCT AAC CGC TGC ACT TAC CCT T | Compound 6 |

Measurement of Quenching Property

To confirm the quenching property of the double-labeled probe of Table 3, real time PCR was performed with the composition shown in Table 4 below (Biorad, using CFX-96). The result of real time PCR was shown in FIG. 2 (PCR Protocol: 95° C., 3 min–[95° C., 10 s–60° C., 30 s]×50 cycles).

TABLE 4

| Classification | Content (μl) |
|---|---|
| Master Mix (Biolin Probe Master Mix (2X)) | 20 μl |
| Primer | 10 pmole each |
| CalfluorRed ®610-Compound 6 probe | 5 pmole |

TABLE 4-continued

| Classification | Content (μl) |
|---|---|
| Template | Hyman gDNA 1 ng & Target plasmid 100 fg |
| PCR water | up to 40 μl |

Figure 2:
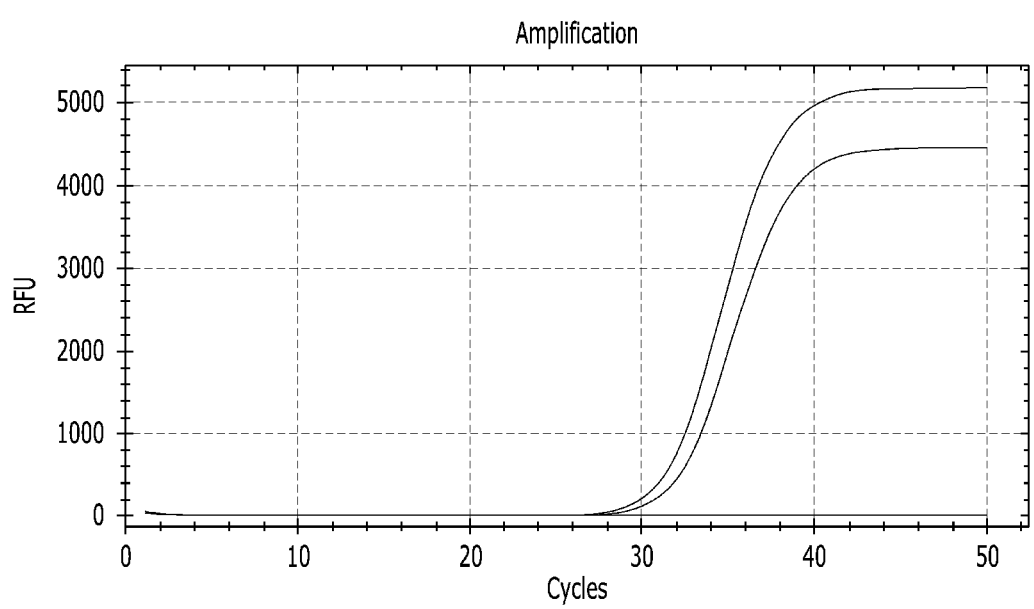

Referring to FIG. 2 showing the result of real time PCR of the double-labeled probe consisting of CalfluorRed® 610 and Compound 6 as a fluorophore and a quencher, respectively, it can be confirmed that Compound 6 effectively quenches the fluorescence of CalfluorRed® 610 and PCR amplification was also carried out with an ideal pattern.

Experimental Example 3. Measurement of Quenching Property of Compound 7

Synthesis of Double-Labeled Oligonucleotide

A double-labeled oligonucleotide was synthesized using Compound 7-CPG synthesized in Preparation Example 6 and CalfluorRed® 610 by a 10-Column Polygen DNA Synthesizer. The synthesized double-labeled oligonucleotide was subjected to cleavage and deprotection by general methods, followed by purification through RP HPLC. The sequence of the double-labeled synthetic oligonucleotide is shown in Table 5 below.

TABLE 5

| 5' fluorophore | Probe sequence | 3' quencher |
|---|---|---|
| CalfluorRed® 610 | AGC CTT TCT AAC CGC TGC ACT TAC CCT T | Compound 7 |

Measurement of Quenching Property

To confirm the quenching property of the double-labeled probe of Table 5, real time PCR was performed with the composition shown in Table 6 below (Biorad, using CFX-96). The result of real time PCR was shown in FIG. 3 (PCR Protocol: 95° C., 3 min-[95° C., 10 s–60° C., 30 s]×50 cycles).

TABLE 6

| Classification | Content (μl) |
|---|---|
| Master Mix (Biolin Probe Master Mix (2X)) | 20 μl |
| Primer | 10 pmole each |
| CalfluorRed ®610-Compound 7 probe | 5 pmole |
| Template | Hyman gDNA 1 ng & Target plasmid 100 fg |
| PCR water | up to 40 μl |

Figure 3:
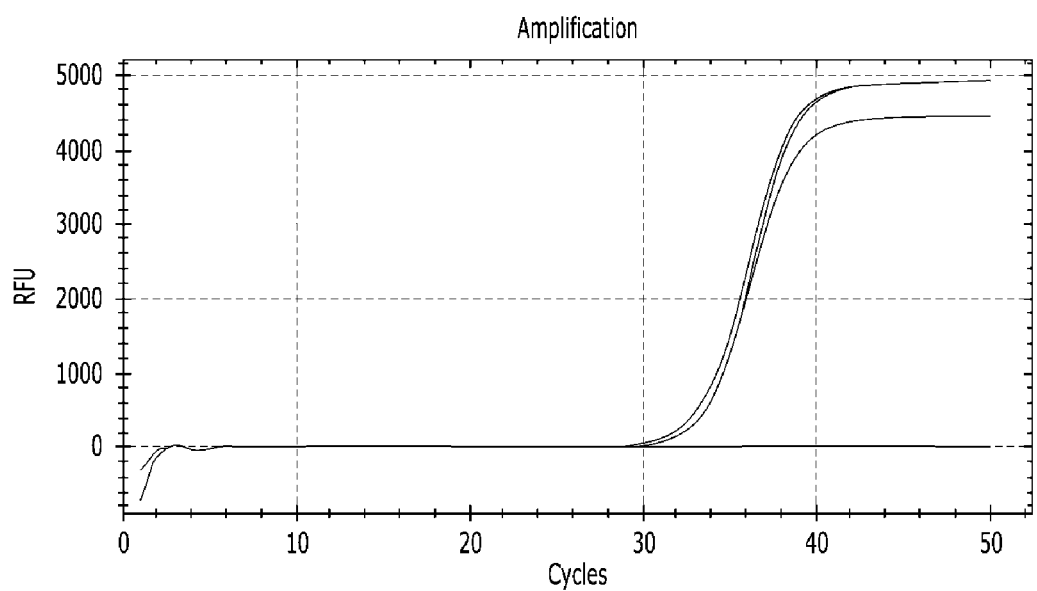

Referring to FIG. 3 showing the result of real time PCR of the double-labeled probe consisting of CalfluorRed® 610 and Compound 7 as a fluorophore and a quencher, respectively, it can be confirmed that Compound 7 effectively quenches the fluorescence of CalfluorRed® 610 and PCR amplification was also carried out with an ideal pattern.

Experimental Example 4. Measurement of Quenching Property of Compound 9

Synthesis of Double-Labeled Oligonucleotide

A double-labeled oligonucleotide was synthesized using Compound 9-CPG synthesized in Preparation Example 6 and CalfluorRed® 610 by a 10-Column Polygen DNA Synthesizer. The synthesized double-labeled oligonucleotide was subjected to cleavage and deprotection by general methods, followed by purification through RP HPLC. The sequence of the double-labeled synthetic oligonucleotide is shown in Table 7 below.

TABLE 7

| 5' fluorophore | Probe sequence | 3' quencher |
|---|---|---|
| CalfluorRed® 610 | AGC CTT TCT AAC CGC TGC ACT TAC CCT T | Compound 9 |

Measurement of Quenching Property

To confirm the quenching property of the double-labeled probe of Table 7, real time PCR was performed with the composition shown in Table 8 below (Biorad, using CFX-96). The result of real time PCR was shown in FIG. 4 (PCR Protocol: 95° C., 3 min–[95° C., 10 s–60° C., 30 s]×50 cycles)

TABLE 8

| Classification | Content (µl) |
|---|---|
| Master Mix (Biolin Probe Master Mix (2X)) | 20 µl |
| Primer | 10 pmole each |
| CalfluorRed ®610-Compound 9 probe | 5 pmole |
| Template | Hyman gDNA 1 ng & Target plasmid 100 fg |
| PCR water | up to 40 µl |

Figure 4:
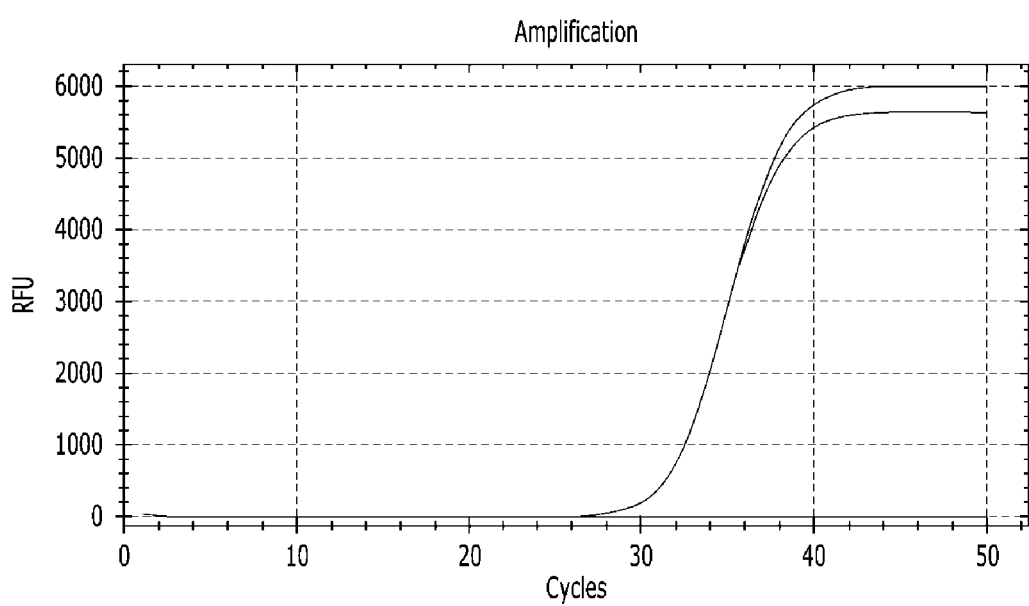

Referring to FIG. 4 showing the result of real time PCR of the double-labeled probe consisting of CalfluorRed® 610 and Compound 9 as a fluorophore and a quencher, respectively, it can be confirmed that Compound 9 effectively quenches the fluorescence of CalfluorRed® 610 and PCR amplification was also carried out with an ideal pattern.

In the above, the embodiments of the present invention have been described, but it will be understood by those of ordinary skill in the art that the present invention may be changed and modified in various ways by addition, modification, or deletion of components without departing from the spirit of the present invention defined in the appended claims.

What is claimed is:

1. A quencher represented by Formula 1 below:

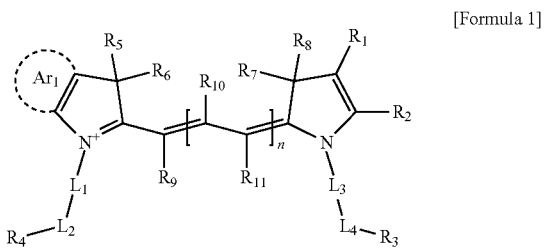

[Formula 1]

wherein $R_1$ and $R_2$ are each conjugated with a and b, b and c, or c and d of Formula 2 below,

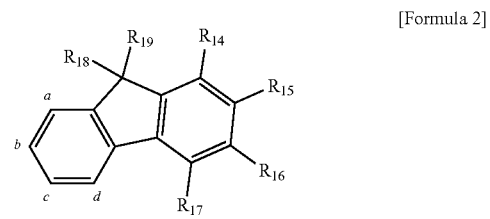

[Formula 2]

$Ar_1$ is selected from substituted or unsubstituted aryl, substituted or unsubstituted heteroaryl, and Formula 2, n is an integer of 1 to 3, and $R_3$ to $R_{19}$ are each independently selected from a functional group selected from hydrogen, deuterium, substituted or unsubstituted $C_1$-$C_{10}$ alkyl, substituted or unsubstituted $C_1$-$C_{10}$ heteroalkyl containing at least one hetero atom, substituted or unsubstituted $C_2$-$C_{10}$ alkenyl, substituted or unsubstituted $C_2$-$C_{10}$ alkynyl, substituted or unsubstituted $C_3$-$C_{20}$ cycloalkyl, substituted or unsubstituted $C_1$-$C_{10}$ alkoxy, substituted or unsubstituted aryloxy, substituted or unsubstituted $C_1$-$C_{10}$ haloalkyl, a halogen, cyano, hydroxy, substituted or unsubstituted amino, substituted or unsubstituted amide, carbamate, sulfhydryl, nitro, carboxyl, carboxylate, substituted or unsubstituted aryl, substituted or unsubstituted heteroaryl, substituted or unsubstituted aralkyl, quaternary ammonium, phosphoric acid, phosphate, substituted ketone, aldehyde, substituted ester, substituted sulfonyl, substituted or unsubstituted sulfonamide, acyl chloride, sulfonic acid,

SEQUENCE LISTING

<160> NUMBER OF SEQ ID NOS: 1

<210> SEQ ID NO 1
<211> LENGTH: 28
<212> TYPE: DNA
<213> ORGANISM: Artificial sequence
<220> FEATURE:
<223> OTHER INFORMATION: synthetic construct

<400> SEQUENCE: 1
agcctttcta accgctgcac ttaccctt    28 sulfonate, hydrazine, thiol, acetal, ketal, phosphonate (phosphite), hypophosphite, sulfohydroxy, sulfate, azido, guanidium, ketene, thiocarbonyl, aminothiocarbonyl, polyalkyleneoxide, a carboxyl derivative, dienophile, sulfonyl halide, epoxide, and phosphoramidite; and a reactive group capable of covalent bonding with a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, $R_5$ and $R_6$ are each independently present or connected to form a ring, $R_7$ and $R_8$ are each independently present or connected to form a ring, $R_{18}$ and $R_{19}$ are each independently present or connected to form a ring, and $L_1$ and $L_3$ are linkers including a single bond or 1 to 40 non-hydrogen atoms, and $L_2$ and $L_4$ are linkers including 1 to 40 non-hydrogen atoms.

2. The quencher of claim 1, wherein $R_1$ and $R_2$ of Formula 1 are conjugated with a and b of Formula 2.

3. The quencher of claim 1, wherein $R_1$ and $R_2$ of Formula 1 are conjugated with b and c of Formula 2.

4. The quencher of claim 1, wherein $R_1$ and $R_2$ of Formula 1 are conjugated with c and d of Formula 2.

5. The quencher of claim 1, wherein at least one of $R_3$ to $R_{19}$ is a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group.

6. The quencher of claim 1, wherein at least one of at least one of the substituents of $R_3$ to $R_{19}$ and $Ar_1$ is a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group.

7. The quencher of claim 1, wherein the reactive group is selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, and protected with a protective group.

8. The quencher of claim 1, wherein adjacent substituents of $R_{14}$ to $R_{17}$ are connected to each other to form a ring.

9. The quencher of claim 1, wherein at least one of the substituents of $Ar_1$ is a substituted amino group.

10. The quencher of claim 9, wherein the substituent binding to nitrogen of the amino group is connected with another substituent binding to the nitrogen to form a ring, or with another substituent, other than the amino group, to form a ring.

11. The quencher of claim 1, which is represented by Formula 3 below:

[Formula 3]

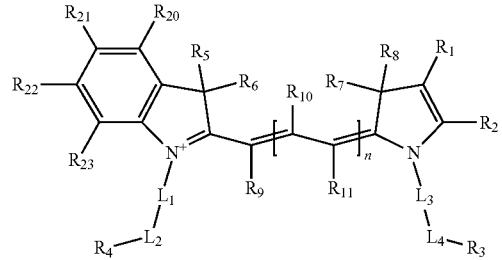

$R_{21}$ to $R_{23}$ are as defined above for $R_3$ to $R_{19}$, at least one of $R_3$ to $R_{23}$ is a functional group selected from carboxyl, a carboxyl derivative, hydroxyl, haloalkyl, dienophile, aldehyde, ketone, sulfonyl halide, thiol, amine, sulfhydryl, alkene, epoxide, and phosphoramidite, or a reactive group capable of covalent bonding with the functional group, and at least one of $R_3$ to $R_{23}$ is a substituted or unsubstituted amino group.

12. The quencher of claim 11, wherein at least one of $R_{20}$ to $R_{23}$ is a substituted amino group.

13. The quencher of claim 11, wherein $R_{21}$ is a substituted amino group.

14. The quencher of claim 12, wherein the substituent binding to nitrogen of the amino group forms a ring by connection with another substituent binding to the nitrogen, or by connection with another substituent, other than the amino group.

* * * * *